(12) United States Patent
Moretto et al.

(10) Patent No.: US 11,249,026 B2
(45) Date of Patent: Feb. 15, 2022

(54) USE OF RAMAN SPECTROSCOPY TO MONITOR CULTURE MEDIUM

(71) Applicant: Biogen MA Inc., Cambridge, MA (US)

(72) Inventors: Justin Moretto, Apex, NC (US); Brandon Berry, Boston, MA (US); Alex Doane, Raleigh, NC (US)

(73) Assignee: Biogen MA Inc., Cambridge, MA (US)

( * ) Notice: Subject to any disclaimer, the term of this patent is extended or adjusted under 35 U.S.C. 154(b) by 112 days.

(21) Appl. No.: 14/775,255

(22) PCT Filed: Mar. 14, 2014

(86) PCT No.: PCT/US2014/029633
§ 371 (c)(1),
(2) Date: Sep. 11, 2015

(87) PCT Pub. No.: WO2014/144999
PCT Pub. Date: Sep. 18, 2014

(65) Prior Publication Data
US 2016/0025633 A1 Jan. 28, 2016

Related U.S. Application Data

(60) Provisional application No. 61/798,187, filed on Mar. 15, 2013.

(51) Int. Cl.
*G01N 21/65* (2006.01)
*G01J 3/44* (2006.01)

(52) U.S. Cl.
CPC .............. *G01N 21/65* (2013.01); *G01J 3/44* (2013.01); *G01N 2201/0446* (2013.01); *G01N 2201/06113* (2013.01)

(58) Field of Classification Search
CPC .......... G01N 21/65; G01J 3/44; C12N 5/0068
See application file for complete search history.

(56) References Cited

U.S. PATENT DOCUMENTS

| | | | |
|---|---|---|---|
| 5,243,983 A * | 9/1993 | Tarr | A61B 5/1455 351/221 |
| 6,350,367 B1 | 2/2002 | West | |
| 7,521,203 B2 | 4/2009 | Lin et al. | |
| 8,224,415 B2 | 7/2012 | Budiman | |
| 9,506,867 B2 | 11/2016 | Moretto et al. | |
| 10,563,163 B2 | 2/2020 | Berry et al. | |
| 2004/0180379 A1 | 9/2004 | Van Duyne et al. | |
| 2004/0204634 A1 * | 10/2004 | Womble | A61B 5/0059 600/322 |
| 2005/0089993 A1 | 4/2005 | Boccazzi et al. | |
| 2006/0281068 A1 | 12/2006 | Maier et al. | |
| 2008/0299539 A1 | 12/2008 | Lee et al. | |
| 2009/0023804 A1 | 1/2009 | Baugh et al. | |
| 2009/0046284 A1 | 2/2009 | Wang et al. | |
| 2009/0104594 A1 | 4/2009 | Webb | |
| 2009/0134043 A1 | 5/2009 | Ward et al. | |
| 2009/0312851 A1 | 12/2009 | Mishra | |
| 2010/0256336 A1 | 10/2010 | Yuk et al. | |
| 2012/0123688 A1 | 5/2012 | Ramasubramanyan et al. | |
| 2012/0229796 A1 | 9/2012 | Priore | |
| 2013/0161191 A1 | 6/2013 | Wilhelm et al. | |
| 2013/0189723 A1 | 7/2013 | Felder et al. | |
| 2013/0286380 A1 * | 10/2013 | Selker | G01J 3/44 356/51 |
| 2014/0185033 A1 | 7/2014 | Moretto et al. | |
| 2017/0130186 A1 | 5/2017 | Berry et al. | |
| 2018/0291329 A1 | 10/2018 | Moretto et al. | |

FOREIGN PATENT DOCUMENTS

| | | |
|---|---|---|
| WO | WO 97/14430 A | 4/1997 |
| WO | WO 1998/041611 A1 | 9/1998 |
| WO | WO 2004/104186 A1 | 12/2004 |
| WO | WO 2012/059748 A1 | 5/2012 |
| WO | WO 2014/144999 A1 | 9/2014 |
| WO | WO 2016/004322 A2 | 1/2016 |

OTHER PUBLICATIONS

Gorfien et al. "Optimized Nutrient Additives for Fed-Batch Cultures" (Apr. 2003) BioPharm International, pp. 34-39.*
Chen et al. "A New Approach to Near-Infrared Spectral Data Analysis Using Independent Component Analysis", Dec. 2001, J. Chem. Inf. Comput. Sci., vol. 41: 992-1001. (Year: 2001).*
Lieber, et al. "Automated Method for Subtractin of Fluorescence from Biological Raman Spectra" (2003), Applied Spectroscopy, bol. 57, No. 11: 1363-1367. (Year: 2003).*
Li et al. "Rapid Characterization and Quality Control of Complex Cell Culture Media Solutions Using Raman Spectroscopy and Chemometrics", (2010), Biotech Bioengineer, vol. 107, No. 2: 290-301. (Year: 2010).*
Abu-Absi et al., Real time monitoring of multiple parameters in mammalian cell culture bioreactors using an in-line Raman spectroscopy probe. Biotechnol Bioeng. May 2011;108(5):1215-21. doi: 10.1002/bit.23023. Epub Dec. 22, 2010.
Berry et al., Cross-scale predictive modeling of CHO cell culture growth and metabolites using Raman spectroscopy and multivariate analysis. Biotechnol Prog. Mar.-Apr. 2015;31(2):566-77. doi:10. 1002/btpr.2035. Epub Dec. 29, 2014.
Chen et al., Effects of elevated ammonium on glycosylation gene expression in CHO cells. Metab Eng. Mar. 2006;8(2):123-32. Epub Dec. 27, 2005.

(Continued)

*Primary Examiner* — Teresa E Knight
(74) *Attorney, Agent, or Firm* — Wolf, Greenfield & Sacks, P.C.

(57) ABSTRACT

In one aspect, the disclosure provides a method of defining a Raman signature of a culture component, the method comprising: obtaining a Raman spectrum of a culture component in a non-interfering or minimally-interfering solution, identifying peaks in the Raman spectrum that are associated with the culture component, obtaining a Raman spectrum of a culture medium comprising the culture component, and, removing peaks of the culture component in the Raman spectrum of the culture medium that are distorted compared to the peaks identified in the Raman spectrum of the culture component in a non-interfering or minimally-interfering solution.

15 Claims, 18 Drawing Sheets

(56) References Cited

OTHER PUBLICATIONS

Cline et al., Anomalously Slow Electron Transfer at Ordered Graphite Electrodes: Influence of Electronic Factors and Reactive Sites. J. Phys. Chem. 1994;98(2):5314-5319.

Houde et al., Determination of protein oxidation by mass spectrometry and method transfer to quality control. J Chromatogr A. Aug. 11, 2006;1123(2): 189-98. Epub May 22, 2006.

Jackson et al., Surface-enhanced Raman scattering on tunable plasmonic nanoparticle substrates. PNAS. Dec. 28, 2004;101(52):17930-17935.

Jia et al., Label-free fluorometric assay for acetylcholinesterase and inhibitor screening based on supramolecular assemblies. Anal Methods. 2013;5:5431-5436.

Lee et al., Characterization of raw material influence on mammalian cell culture performance: chemometrics based data fusion approach. Accessed via http://focapo.cheme.cmu.edu/2012/proceedings/data/papers/085.pdf on Dec. 12, 2011. 6 pages.

Lee et al., Data fusion-based assessment of raw materials in mammalian cell culture. Biotechnol Bioeng, Nov. 2012;109(11):2819-28. doi: 10.1002/bit.24548. Epub May 28, 2012.

Li et al., Rapid characterization and quality control of complex cell culture media solution using raman spectroscopy and chemometrics. Biotechnol Bioeng. Oct. 1, 2010;107(2):290-301. doi: 10.1002/bit.22813.

Li et al., Using surface-enhanced Raman scattering (SERS) and fluorescence spectroscopy for screening yeast extracts, a complex component of cell culture media. J. Raman Spectroscopy. 2012;43(8):1074-1082. doi: 10.1002/jrs.3141. Supplemental information.

Martens et al., Extended multiplicative signal correction and spectral interference subtraction: new preprocessing methods for near infrared spectroscopy. J Pharm Biomed Anal. 1991;9(8):625-35.

Molloy et al., Human furin is a calcium-dependent serine endoprotease that recognizes the sequence Arg-X-X-Arg and efficiently cleaves anthrax toxin protective antigen. J Biol Chem. Aug. 15, 1992;267(23):16396-402.

Moretto et al., Process Raman Spectroscopy for In-Tine CHO Cell Culture Monitoring. Apr. 2011. American Pharmaceutical Review.

Mungikar et al., Use of In-line Raman Spectroscopy as a Nondestructive and Rapid Analytical Technique to Monitor Aggregation of a Therapeutic Protein. Nov. 2010. American Pharmaceutical Review.

Raman et al., A New Type of Secondary Radiation. Nature. Mar. 1928;121:501-502.

Rodrigues et al., Assessment of enamel chemistry composition and its relationship with caries susceptibility. Proceedings SPIE. 2005;5687:132-139.

Ryan et al., Prediction of cell culture media performance using fluorescence spectroscopy. Anal Chem. Feb. 15, 2010;82(4):1311-7. doi: 10.1021/ac902337c.

Seli et al., Noninvasive metabolomic profiling of embryo culture media using Raman and near-infrared spectroscopy correlates with reproductive potential of embryos in women undergoing in vitro fertilization. Fertil Steril. Nov. 2007;88(5):1350-7. Epub Oct. 17, 2007.

Shen et al., Accurate and noninvasive embryos screening during in vitro fertilization (IVF) assisted by Raman analysis of embryos culture medium. Laser Physics Letters. 2012;9(4):322-328.

Thomson et al., Resurrecting ancestral alcohol dehydrogenases from yeast. Nat Genet. Jun. 2005;37(6):630-5. Epub May 1, 2005.

Wen et al., Application of Raman Spectroscopy in Biopharmaceutical Manufacturing. Raman. Jun. 2010. 46-53.

Witjes et al., Automatic correction of peak shifts in Raman spectra before PLS regression. Chemo. Intell. Lab. Systems. Aug. 2000;52(1):105-116.

International Preliminary Report on Patentability for Application No. PCT/US2015/039011 dated Jan. 12, 2017.

International Preliminary Report on Patentability for Application No. PCT/US2015/048590 dated Mar. 16, 2017.

Invitation to Pay Additional Fees for Application No. PCT/US2016/034717 dated Sep. 5, 2016.

International Search Report and Written Opinion for Application No. PCT/US2016/034717 dated Nov. 18, 2016.

International Preliminary Report on Patentability for Application No. PCT/US2016/034717 dated Dec. 14, 2017.

Supplementary European Search Report for Application No. EP 14765091.5 dated Oct. 19, 2016.

Supplementary European Search Report for Application No. EP 15815514.3 dated Feb. 20, 2018.

Ashton et al., The challenge of applying Raman spectroscopy to monitor recombinant antibody production. Analyst. Nov. 21, 2013;138(22):6977-85. doi:10.1039/c3an01341c.

Chang et al., Multi-stage continuous high cell density culture systems: a review. Biotechnol Adv. Mar.-Apr. 2014;32(2):514-25. doi: 10.1016/j.biotechadv.2014.01.004. Epub Jan. 21, 2014.

Li et al., Performance monitoring of mammalian cell based bioprocess using Raman spectroscopy. Analytica Chimica Acta. Aug. 6, 2013;796:84-91.

Matthews et al., Closed loop control of lactate concentration in mammalian cell culture by Raman spectroscopy leads to improved cell density, viability, and biopharmaceutical protein production. Biotechnol Bioeng. Nov. 2016;113(11):2416-24. doi: 10.1002/bit.26018. Epub Jun. 9, 2016.

Milligan et al., Semisynthetic model calibration for monitoring glucose in mammalian cell culture with in situ near infrared spectroscopy. Biotechnol Bioeng. May 2014;111(5):896-903. doi:10.1002/bit.25161. Epub Dec. 17, 2013.

Ozturk et al., Real-time monitoring and control of glucose and lactate concentrations in a mammalian cell perfusion reactor. Biotechnol Bioeng. Feb. 20, 1997;53(4):372-8.

Whelan et al., In Situ Raman Spectroscopy for Simultaneous Monitoring of Multiple Process Parameters in Mammalian Cell Culture Bioreactors. Biotechnology Progress. Jul. 20, 2012;28(5):1355-1362.

Yuk et al., Controlling glycation of recombinant antibody in fed-batch cell cultures. Biotechnol Bioeng. Nov. 2011;108(11):2600-10. doi: 10.1002/bit.23218. Epub Jun. 15, 2011.

EP 15838214.3, dated Jun. 8, 2018, Partial Supplementary European Search Report.

EP 15838214.3, dated Sep. 19, 2018, Supplementary European Search Report.

Al-Jabri et al., Second derivative differential electrolytic potentiometry for oxidation—reduction reactions. Journal of Chemical and Pharmaceutical Research. 2001;4(4):2180-2187.

Collins et al., Indirect procedure for the determination of Tin(II) by potentiometric titration. Analytical Chemistry. Oct. 1962;34(11):1511-1513.

Harris, Quantitative Chemical Analaysis. 7th edition. 2007 W.H. Freeman and Company. pp. 299, 300, 327-331.

Kowalsky, Technetium Radiopharmaceutical Chemistry, Continuing Education for Nuclear Pharmacists and Nuclear Medicine Professionals. vol. 12, Lesson 3. 2006. The University of New Mexico Health Sciences Center College of Pharmacy. 77 pages.

Kowalsky et al., Re: Stability of stannous ion in stannous pyrophosphate kits. J Nucl Med. Nov. 1983;24(11): 1080-1.

Ponte, Special safety considerations in preparation of technetium Tc-99m DTPA for cerebrospinal fluid-related imaging procedures. J Am Pharm Assoc (2003). May-Jun. 2008;48(3):413-6. doi: 10.1331/JAPhA.2008.07038.

Vanlić-Razumenić et al., Oxidation states of technetium in diphosphonate complexes. D. Journal of Radioanalytical and Nuclear Chemistry, Articles. 1995;190(1):149-154.

U.S. Appl. No. 16/741,044, filed Jan. 13, 2020, Berry et al.

Partial Supplementary European Search Report for Application No. EP 15838214.3 dated Jun. 8, 2018.

Supplementary European Search Report for Application No. 15838214.3 dated Sep. 19, 2018.

\* cited by examiner

USE OF RAMAN SPECTROSCOPY TO MONITOR CULTURE MEDIUM

RELATED APPLICATIONS

This application is a national stage filing under 35 U.S.C. § 371 of International Patent Application No. PCT/US2014/029633, filed Mar. 14, 2014, entitled "USE OF RAMAN SPECTROSCOPY TO MONITOR CULTURE MEDIUM," which claims the benefit under 35 U.S.C. § 119(e) of U.S. provisional application number 61/798,187, filed Mar. 15, 2013, entitled "USE OF RAMAN SPECTROSCOPY TO MONITOR CULTURE MEDIUM," each of which is incorporated by reference herein in its entirety.

FIELD

The invention is in the field of spectroscopic analysis of biological samples.

BACKGROUND

The production of biological materials in culture medium often involves expensive starting material, fine tuning of the balance of culture components and metabolites, and complex time-consuming synthesis and purification steps. The production process can fail at any stage due to unbalance in the various components and metabolites in the culture medium. However, failure often is not detected until late in the production process when final yields are evaluated. This can result in an expensive waste of time and material.

SUMMARY

In one aspect, the disclosure provides methods for using Raman spectroscopy to evaluate culture component levels in a culture medium and methods for adjusting culture component levels.

In one aspect, the disclosure provides a method of defining a Raman signature of a culture component, a method comprising obtaining a Raman spectrum of a culture component in a non-interfering or minimally-interfering solution, identifying peaks in the Raman spectrum that are associated with the culture component, obtaining a Raman spectrum of a culture medium comprising the culture component, and, removing peaks of the culture component in the Raman spectrum of the culture medium that are distorted compared to the peaks identified in the Raman spectrum of the culture component in a non-interfering or minimally-interfering solution.

In some embodiments, the distorted peaks are laterally shifted peaks and inverted peaks. In some embodiments, the laterally shifted peak or inverted peak is removed if it is shifted by more than 5 $cm^{-1}$ in a concentration dependent fashion. In some embodiments, the culture component is glucose.

In one aspect, the disclosure provides a Raman signature of glucose, wherein the Raman signature comprises at least 4 peaks in the 200 $cm^{-1}$ to 3400 $cm^{-1}$ wavenumber range.

In one aspect, the disclosure provides a Raman signature of glucose, wherein the Raman signature comprises at least 6 peaks in the 200 $cm^{-1}$ to 3400 $cm^{-1}$ wavenumber range. In some embodiments, the peaks are
  peak 1, range: 364-440, peak 402 (all in $cm^{-1}$),
  peak 2, range: 511-543, peak 527 (all in $cm^{-1}$),
  peak 3, range: 577-600, peak 589 (all in $cm^{-1}$),
  peak 4, range: 880-940, peak 911 (all in $cm^{-1}$),
  peak 5, range: 1130-1180, peak 1155 (all in $cm^{-1}$), and
  peak 6, range: 1262-1290, peak 1276 (all in $cm^{-1}$).

In one aspect, the disclosure provides a Raman signature of glucose, wherein the Raman signature comprises at least 10 peaks in the 200 $cm^{-1}$ to 3400 $cm^{-1}$ wavenumber range. In some embodiments, the peaks are
  peak 1, range: 364-440, peak 402 (all in $cm^{-1}$),
  peak 2, range: 511-543, peak 527 (all in $cm^{-1}$),
  peak 3, range: 577-600, peak 589 (all in $cm^{-1}$),
  peak 4, range: 749-569, peak 759 (all in $cm^{-1}$),
  peak 5, range: 880-940, peak 911 (all in $cm^{-1}$),
  peak 6, range: 1050-1070, peak 1060 (all in $cm^{-1}$),
  peak 7, range: 1110-1140, peak 1125 (all in $cm^{-1}$),
  peak 8, range: 1130-1180, peak 1155 (all in $cm^{-1}$),
  peak 9, range: 1262-1290, peak 1276 (all in $cm^{-1}$), and
  peak 10, range: 1520-1578, peak 1549 (all in $cm^{-1}$).

In one aspect, the disclosure provides a Raman signature of glucose, wherein the Raman signature comprises at least 20 peaks in the 200 $cm^{-1}$ to 3400 $cm^{-1}$ wavenumber range. In some embodiments, the peaks are
  peak 1, range: 364-440, peak 402 (all in $cm^{-1}$),
  peak 2, range: 511-543, peak 527 (all in $cm^{-1}$),
  peak 3, range: 577-600, peak 589 (all in $cm^{-1}$),
  peak 4, range: 720-740, peak 732 (all in $cm^{-1}$),
  peak 5, range: 769-799, peak 789 (all in $cm^{-1}$),
  peak 6, range: 835-875, peak 855 (all in $cm^{-1}$),
  peak 7, range: 880-940, peak 911 (all in $cm^{-1}$),
  peak 8, range: 950-1015, peak 968 (all in $cm^{-1}$),
  peak 9, range: 1050-1070, peak 1060 (all in $cm^{-1}$),
  peak 10, range: 1063-1080, peak 1073 (all in $cm^{-1}$),
  peak 11, range: 1110-1140, peak 1125 (all in $cm^{-1}$),
  peak 12, range: 1130-1180, peak 1155 (all in $cm^{-1}$),
  peak 13, range: 1190-1240, peak 1210 (all in $cm^{-1}$),
  peak 14, range: 1262-1290, peak 1276 (all in $cm^{-1}$),
  peak 15, range: 1330-1342, peak 1336 (all in $cm^{-1}$),
  peak 16, range: 1350-1380, peak 1371 (all in $cm^{-1}$),
  peak 17, range: 1390-1410, peak 1401 (all in $cm^{-1}$),
  peak 18, range: 1425-1475, peak 1450 (all in $cm^{-1}$),
  peak 19, range: 1465-1480, peak 1473 (all in $cm^{-1}$), and
  peak 20, range: 1520-1578, peak 1549 (all in $cm^{-1}$).

In one aspect, the disclosure provides methods of evaluating a culture component level in a culture medium that comprise obtaining a Raman spectrum of a culture medium, parsing the Raman spectrum with a Raman signature of the culture component to identify peaks corresponding the culture component, and measuring the intensity of the identified peaks to evaluate the culture component level in the medium.

In some embodiments, methods further comprise adjusting the culture component level if the level is outside a predetermined range.

In one aspect, the disclosure provides methods of evaluating a culture component level in a culture medium that comprise: obtaining a Raman spectrum of a culture medium, parsing the Raman spectrum with a Raman signature of the culture component to identify peaks corresponding the culture component, and measuring the intensity of the identified peaks to evaluate the culture component level in the medium, and wherein the culture component is glucose. In some embodiments of methods provided herein, the Raman signature of glucose comprises at least 4 peaks in the 200 $cm^{-1}$ to 3400 $cm^{-1}$ wavenumber range.

In some embodiments of methods provided herein, the Raman signature of glucose comprises at least 6 peaks in the 200 $cm^{-1}$ to 3400 $cm^{-1}$ wavenumber range. In some embodiments, the peaks are peak 1, range: 364-440, peak 402 (all in cm$^{-1}$),
peak 2, range: 511-543, peak 527 (all in cm$^{-1}$),
peak 3, range: 577-600, peak 589 (all in cm$^{-1}$),
peak 4, range: 880-940, peak 911 (all in cm$^{-1}$),
peak 5, range: 1130-1180, peak 1155 (all in cm$^{-1}$), and
peak 6, range: 1262-1290, peak 1276 (all in cm$^{-1}$).

In some embodiments of methods provided herein, the Raman signature of glucose comprises at least 10 peaks in the 200 cm$^{-1}$ to 3400 cm$^{-1}$ wavenumber range. In some embodiments, the peaks are
peak 1, range: 364-440, peak 402 (all in cm$^{-1}$),
peak 2, range: 511-543, peak 527 (all in cm$^{-1}$),
peak 3, range: 577-600, peak 589 (all in cm$^{-1}$),
peak 4, range: 749-569, peak 759 (all in cm$^{-1}$),
peak 5, range: 880-940, peak 911 (all in cm$^{-1}$),
peak 6, range: 1050-1070, peak 1060 (all in cm$^{-1}$),
peak 7, range: 1110-1140, peak 1125 (all in cm$^{-1}$),
peak 8, range: 1130-1180, peak 1155 (all in cm$^{-1}$),
peak 9, range: 1262-1290, peak 1276 (all in cm$^{-1}$), and
peak 10, range: 1520-1578, peak 1549 (all in cm$^{-1}$).

In some embodiments of methods provided herein, the Raman signature of glucose comprises at least 20 peaks in the 200 cm$^{-1}$ to 3400 cm$^{-1}$ wavenumber range. In some embodiments, the peaks are
peak 1, range: 364-440, peak 402 (all in cm$^{-1}$),
peak 2, range: 511-543, peak 527 (all in cm$^{-1}$),
peak 3, range: 577-600, peak 589 (all in cm$^{-1}$),
peak 4, range: 720-740, peak 732 (all in cm$^{-1}$),
peak 5, range: 769-799, peak 789 (all in cm$^{-1}$),
peak 6, range: 835-875, peak 855 (all in cm$^{-1}$),
peak 7, range: 880-940, peak 911 (all in cm$^{-1}$),
peak 8, range: 950-1015, peak 968 (all in cm$^{-1}$),
peak 9, range: 1050-1070, peak 1060 (all in cm$^{-1}$),
peak 10, range: 1063-1080, peak 1073 (all in cm$^{-1}$),
peak 11, range: 1110-1140, peak 1125 (all in cm$^{-1}$),
peak 12, range: 1130-1180, peak 1155 (all in cm$^{-1}$),
peak 13, range: 1190-1240, peak 1210 (all in cm$^{-1}$),
peak 14, range: 1262-1290, peak 1276 (all in cm$^{-1}$),
peak 15, range: 1330-1342, peak 1336 (all in cm$^{-1}$),
peak 16, range: 1350-1380, peak 1371 (all in cm$^{-1}$),
peak 17, range: 1390-1410, peak 1401 (all in cm$^{-1}$),
peak 18, range: 1425-1475, peak 1450 (all in cm$^{-1}$),
peak 19, range: 1465-1480, peak 1473 (all in cm$^{-1}$), and
peak 20, range: 1520-1578, peak 1549 (all in cm$^{-1}$).

In some embodiments methods provided herein further comprise adjusting the glucose level if the level is outside a predetermined range. In some embodiments, the method further comprises adjusting the glucose level if the level is outside a range of 1-3 g/L.

In some embodiments of methods provided herein further comprise evaluating one or more of the following culture parameters: viable cell density, level of lactate, level of glutamine, level of glutamate, level of ammonium, osmolality, or pH. In some embodiments, the one or more culture parameters are determined by Raman spectroscopy. In some embodiments, evaluating the level of glucose and the one or more culture parameters is done simultaneously.

In some embodiments of methods provided herein further comprise adjusting the level of glucose if the level is outside a predetermined combination of ranges of glucose level and the one or more culture parameters. In some embodiments, the method further comprises adjusting the glucose level if the level is outside a range of 1-3 g/L.

In some embodiments of methods provided herein further comprise adjusting the one or more culture parameters if the one or more culture parameters are outside a predetermined combination of ranges of glucose level and the one or more culture parameters.

In some embodiments of methods provided herein, the level of glucose and the one or more culture parameters are evaluated on a continuing basis, and the level of glucose and/or the one or more culture parameters are adjusted if the level of glucose and/or the one or more culture parameters are outside a predetermined combination of ranges of glucose level and the one or more culture parameters. In some embodiments, the level of glucose and/or the one or more culture parameters are evaluated every hour.

DETAILED DESCRIPTION OF THE INVENTION

Figure 1:
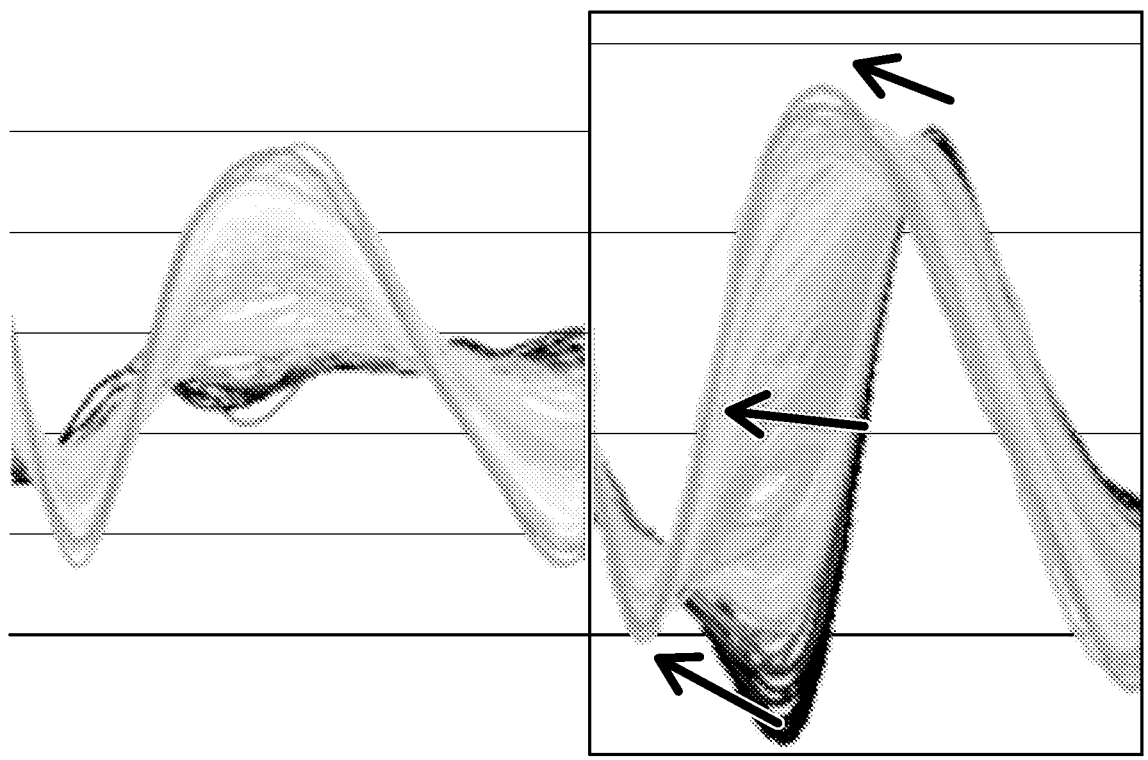
FIG. 1 is a non-limiting example of a lateral peak shift; a basis peak is shown on the left, with a media peak exhibiting a lateral shift shown on the right.

In one aspect, the disclosure provides methods for using Raman spectroscopy to evaluate culture component levels in a culture medium and methods for adjusting culture component levels. The disclosure provides new methods for determining the level of a culture component in a culture medium. In some embodiments, the culture component is a nutrient, protein, peptide, carbohydrate (e.g., sugar), growth factor, cytokine or salt. For example, the culture component may be glutamine, glutamate, glucose, lactate, or ammonium. Evaluating the level of a component during the biological production process can be used to monitor the progress of the biological production process. Thus, for instance, if glucose is consumed during a biological production process, glucose may be added during the process to maintain a concentration range of glucose that is optimal for cell growth. Methods provided herein allow for the monitoring of the levels of a component, such as glucose, in culture medium. It should be appreciated that culture medium is a complex sample with many components that makes evaluating the levels of a particular component in a sample challenging. The instant disclosure addresses the challenges of evaluating the levels of a particular component in a sample by providing Raman spectroscopy based methods that allow for the evaluation of the levels of a particular component in a culture medium.

Methods for Generating a Raman Signature

In one aspect, methods provided herein use a Raman signature of a culture component to evaluate the level of the culture component in the culture medium. In one aspect, the disclosure provides methods of defining a Raman signature of a culture component. In some embodiments, methods comprise obtaining a Raman spectrum of a culture component in a non-interfering or minimally-interfering solution, identifying peaks in the Raman spectrum that are associated with the culture component, obtaining a Raman spectrum of a culture medium comprising the culture component, and, removing peaks of the culture component in the Raman spectrum of the culture medium that are distorted compared to the peaks identified in the Raman spectrum of the culture component in a non-interfering or minimally-interfering solution. In some embodiments, the distorted peaks are laterally shifted peaks and inverted peaks. In some embodiments, the laterally shifted peak or inverted peak is removed if it is shifted by more than 5 $cm^{-1}$ in a concentration dependent fashion. In some embodiments of methods provided herein, the culture component is glucose.

In one aspect of methods provided herein, a Raman spectrum of a component in a non-interfering or minimally-interfering solution is obtained. A non-interfering or minimally-interfering solution is a solution that allows for the generation of a Raman spectrum of a component with little to no interference of the component with other agents in the solution. In some embodiments, a non-interfering or minimally-interfering solution would be water, which may or may not have additional non-interfering or minimally-interfering components, such as buffers or salts. However, other non-interfering or minimally-interfering solutions may be used as aspects of the disclosure are not limited in this respect.

Raman spectra are obtained of a molecule of interest (e.g., glucose) dissolved in a simple solvent such as water (e.g., by using an excitation laser). In some embodiments, Raman spectra will be obtained of multiple samples of a particular component at multiple concentrations. The samples used to build this spectral Raman library cover a range of concentrations that represents a reasonable approximation of the experimental range (e.g., the concentration range of the component in a culture medium). In some embodiments, a particular component is at a concentration in a range of 0.001 g/L to 0.05 g/L, 0.001 g/L to 0.1 g/L, 0.001 g/L to 0.5 g/L, 0.001 g/L to 1.0 g/L, 0.001 g/L to 10 g/L, 0.01 g/L to 0.05 g/L, 0.01 g/L to 0.1 g/L, 0.01 g/L to 0.5 g/L, 0.01 g/L to 1.0 g/L, 0.01 g/L to 10 g/L, 0.1 g/L to 0.5 g/L, 0.1 g/L to 1.0 g/L, 0.1 g/L to 10 g/L, 0.5 g/L to 1.0 g/L, or 0.5 g/L to 10 g/L, Thus, for instance, Raman spectra may be obtained from the same component at different concentration increments, such as increments of 0.001 g/L, 0.005 g/L, 0.01 g/L, 0.05 g/L, 0.1 g/L, 0.2 g/L, 0.3 g/L, 0.4 g/L, 0.5 g/L, 0.6 g/L, 0.7 g/L, 0.8 g/L, 0.9 g/L, 1.0 g/L, etc. The data obtained by using these Raman spectra are analyzed, including derivatizing and normalizing of the data if needed. Computer programs, including statistical software, may be used in this process. The data analysis results in peaks in the Raman spectrum that represent the basis peaks for the molecule of interest. The spectra are correlated with the known concentration of the molecule of interest (e.g., glucose).

In some embodiments, Raman spectra are also obtained of various concentrations of a molecule of interest (e.g., glucose) added to a culture medium of interest. It should be appreciated that the culture medium of interest may have a variety of make ups. However, the culture medium of interest ideally should mimic closely the biological production culture medium and should include the major components present in cell culture media (polypeptide, sugars, salts, nucleic acids, cellular debris, and nutrients). The peaks identified in the Raman spectra of the molecule of interest (e.g., glucose) in the non-interfering or minimally-interfering solution are used to identify peaks in the Raman spectra of the molecule of interest (e.g., glucose) in the culture medium. The spectra of the molecule of interest (e.g., glucose) in the culture medium are trimmed to match the previously the peaks identified in the Raman spectra of the molecule of interest (e.g., glucose) in the non-interfering or minimally-interfering solution. In some embodiments, the spectra are trimmed by removing peaks that are distorted. In some embodiments, peaks that are distorted are peaks that are laterally shifted or inverted. However, it should be appreciated that distorted peaks may include any peak that fails to meet certain criteria (e.g., intensity, signal-to-noise (S/N) ratio, shape, closeness to other peaks). Distorted peaks can be identified by visual inspection or by using a computer program that identifies (and removes) peaks that do not meet certain criteria. For example, peaks may be excluded because they are laterally shifted or inverted by at least 5%, at least 10%, at least 20%, at least 30%, at least 40%, or at least 50% compared with a reference peak (e.g., a non-distorted peak). Similarly, peaks may be excluded because they have a S/N ratio that is at least 5%, at least 10%, at least 20%, at least 30%, at least 40%, or at least 50% less than the S/N of a reference peak (e.g., a non-distorted peak).

In some embodiments, only a portion of a Raman spectrum is evaluated. For example, data relating to only a portion of the Raman spectrum is evaluated and the remaining data is filtered or otherwise removed prior to analysis.

In some embodiments, the distorted peaks that are removed are lateral peak shifts. As provided for instance in the figures herein, a lateral peak shift looks like a 2-dimensional peak that has been stretched out. This peak distortion is likely the result of a component in the culture medium that is interacting with one of the bonds on the molecule of interest, the presence of a bond with similar character, solvent distortion, or any combination of these phenomena. In some embodiments, the laterally shifted peak or inverted peak is shifted by more than 5 $cm^{-1}$ in a concentration dependent fashion. In some embodiments, the lateral peak is removed if it is shifted by more than 1 $cm^{-1}$, more than 2 $cm^{-1}$, more than 5 $cm^{-1}$, more than 10 $cm^{-1}$, or more than 20 $cm^{-1}$ or more. In some embodiments, the lateral peak is removed if it is shifted by more than 1 cm , more than 2 cm , more than 5 cm , more than 10 $cm^{-1}$, or more than 20 $cm^{-1}$ or more, in a concentration dependent fashion.

In some embodiments, the distorted peaks that are removed are inversion peaks (also called "inverted peaks" herein). As provided for instance in the figures herein, an inversion peak is a peak where it appears that the lower concentration data is higher in magnitude than the high concentration data, when this relationship did not exist in the basis peaks. This type of distortion is usually due to a molecular species within the media that has similar vibrational properties and therefore similar peaks. In some embodiments, the inverted peak is removed if there is a lack of baseline.

In one aspect, the spectra from which the distorted peaks have been removed provide the Raman signature of the culture component. However it should be appreciated that the Raman signature may be further refined by using the trimmed spectra with the identified peaks through a larger cell culture dataset, e.g., by building a predictive PLS (partial least square) model. For instance, relevant cell culture spectra could be included along with the corresponding offline data for the constituent of interest into a multivariate software package such as SIMCA or the PLS Toolbox add-on for Matlab. In some embodiments, offline constituent data are collected through an appropriate analytical method and added to the model.

Raman Signature

In one aspect, the disclosure provides Raman signatures of culture components. In some embodiments, the Raman signature comprises a selected number of peaks and associated peak ranges that allow for the evaluation (e.g., identification) of a culture component in a culture medium. In some embodiments, the Raman signature comprises a selected number of peaks and associated peak ranges that allow for the evaluation of the level of a culture component in a culture medium. In some embodiments, a Raman signature of a culture component comprises multiple combinations of identifying peaks. It should be appreciated that a minimal number of peaks may define a Raman signature. However, additional peaks may help refine the Raman signature. Thus, for instance, a Raman signature consisting of 4 peaks may provide a 95% certainty that a culture composition that shows those peaks contains the component associated with the Raman signature. However, a Raman signature consisting of 10 peaks may provide a 99% certainty that a culture composition that shows those peaks contains the component associated with the Raman signature. Similarly, a Raman signature consisting of 4 peaks may provide a 90% certainty that a culture composition that shows those peaks contains the component at the level of the component associated with the Raman signature. However, a Raman signature consisting of 10 peaks may provide a 98% certainty that a culture composition that shows those peaks contains the component at the level of the component associated with the Raman signature.

In one aspect, the disclosure provides Raman signatures of culture components. In some embodiments, the culture component is glucose. In some embodiments, the disclosure provides Raman signatures of glucose that allow for evaluating the presence of glucose in a sample. In some embodiments, the disclosure provides Raman signatures of glucose that allow for evaluating the level of glucose in a sample. In some embodiments, the disclosure provides Raman signatures of glucose that allow for evaluating the presence of glucose in a culture medium. In some embodiments, the disclosure provides Raman signatures of glucose that allow for evaluating the level of glucose in a culture medium.

In one aspect, the Raman signature of glucose comprises peaks in the 200 $cm^{-1}$ to 3400 $cm^{-1}$ wavenumber range. As used herein, wavenumber refers to the spatial frequency of a wave, which may be in cycles per unit distance or radians per unit distance. In some embodiments, the Raman signature of glucose comprises at least 4 peaks in the 200 $cm^{-1}$ to 3400 $cm^{-1}$ wavenumber range. In some embodiments, the Raman signature of glucose comprises at least 6 peaks in the 200 $cm^{-1}$ to 3400 $cm^{-1}$ wavenumber range. In some embodiments, the Raman signature of glucose comprises at least 10 peaks in the 200 $cm^{-1}$ to 3400 $cm^{-1}$ wavenumber range. In some embodiments, the Raman signature of glucose comprises at least 20 peaks in the 200 $cm^{-1}$ to 3400 $cm^{-1}$ wavenumber range. In some embodiments, the Raman signature of glucose comprises at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 25, or at least 30 peaks in the 200 $cm^{-1}$ to 3400 $cm^{-1}$ wavenumber range.

In some embodiments, the Raman signature of glucose comprises at least 4 peaks in the 200 $cm^{-1}$ to 3400 $cm^{-1}$ wavenumber range. In some embodiments, the 4 peaks are selected from the following 6 peaks:
  peak 1, range: 364-440, peak 402 (all in $cm^{-1}$),
  peak 2, range: 511-543, peak 527 (all in $cm^{-1}$),
  peak 3, range: 577-600, peak 589 (all in $cm^{-1}$),
  peak 4, range: 880-940, peak 911 (all in $cm^{-1}$),
  peak 5, range: 1130-1180, peak 1155 (all in $cm^{-1}$), and
  peak 6, range: 1262-1290, peak 1276 (all in $cm^{-1}$).
In some embodiments, the set of 4 selected peaks is: {peak 1, peak 2, peak 3, peak 4}, {peak 1, peak 2, peak 3, peak 5}, {peak 1, peak 2, peak 3, peak 6}, {peak 1, peak 2, peak 4, peak 5},{peak 1, peak 2, peak 4, peak 6}, {peak 1, peak 2, peak 5, peak 6}, {peak 1, peak 3, peak 4, peak 5}, {peak 1, peak 3, peak 4, peak 6}, {peak 1, peak 3, peak 5, peak 6}, {peak 1, peak 4, peak 5, peak 6}, {peak 2, peak 3, peak 4, peak 5 }, {peak 2, peak 3, peak 4, peak 6}, {peak 2, peak 3, peak 5, peak 6}, {peak 2, peak 4, peak 5, peak 6}, or {peak 3, peak 4, peak 5, peak 6}.

In some embodiments, the Raman signature of glucose comprises at least 6 peaks in the 200 $cm^{-1}$ to 3400 $cm^{-1}$ wavenumber range. In some embodiments, the 6 peaks are:
  peak 1, range: 364-440, peak 402 (all in $cm^{-1}$),
  peak 2, range: 511-543, peak 527 (all in $cm^{-1}$),
  peak 3, range: 577-600, peak 589 (all in $cm^{-1}$),
  peak 4, range: 880-940, peak 911 (all in $cm^{-1}$),
  peak 5, range: 1130-1180, peak 1155 (all in $cm^{-1}$), and
  peak 6, range: 1262-1290, peak 1276 (all in $cm^{-1}$).

In some embodiments, the Raman signature of glucose comprises at least 10 peaks in the 200 cm$^{-1}$ to 3400 cm$^{-1}$ wavenumber range. In some embodiments, the 10 peaks are:
peak 1, range: 364-440, peak 402 (all in cm$^{-1}$),
peak 2, range: 511-543, peak 527 (all in cm$^{-1}$),
peak 3, range: 577-600, peak 589 (all in cm$^{-1}$),
peak 4, range: 749-569, peak 759 (all in cm$^{-1}$),
peak 5, range: 880-940, peak 911 (all in cm$^{-1}$),
peak 6, range: 1050-1070, peak 1060 (all in cm$^{-1}$),
peak 7, range: 1110-1140, peak 1125 (all in cm$^{-1}$),
peak 8, range: 1130-1180, peak 1155 (all in cm$^{-1}$),
peak 9, range: 1262-1290, peak 1276 (all in cm$^{-1}$), and
peak 10, range: 1520-1578, peak 1549 (all in cm$^{-1}$).

In some embodiments, the Raman signature of glucose comprises at least 20 peaks in the 200 cm$^{-1}$ to 3400 cm$^{-1}$ wavenumber range. In some embodiments, the 20 peaks are:
peak 1, range: 364-440, peak 402 (all in cm$^{-1}$),
peak 2, range: 511-543, peak 527 (all in cm$^{-1}$),
peak 3, range: 577-600, peak 589 (all in cm$^{-1}$),
peak 4, range: 720-740, peak 732 (all in cm$^{-1}$),
peak 5, range: 769-799, peak 789 (all in cm$^{-1}$),
peak 6, range: 835-875, peak 855 (all in cm$^{-1}$),
peak 7, range: 880-940, peak 911 (all in cm$^{-1}$),
peak 8, range: 950-1015, peak 968 (all in cm$^{-1}$),
peak 9, range: 1050-1070, peak 1060 (all in cm$^{-1}$),
peak 10, range: 1063-1080, peak 1073 (all in cm$^{-1}$),
peak 11, range: 1110-1140, peak 1125 (all in cm$^{-1}$),
peak 12, range: 1130-1180, peak 1155 (all in cm$^{-1}$),
peak 13, range: 1190-1240, peak 1210 (all in cm$^{-1}$),
peak 14, range: 1262-1290, peak 1276 (all in cm$^{-1}$),
peak 15, range: 1330-1342, peak 1336 (all in cm$^{-1}$),
peak 16, range: 1350-1380, peak 1371 (all in cm$^{-1}$),
peak 17, range: 1390-1410, peak 1401 (all in cm$^{-1}$),
peak 18, range: 1425-1475, peak 1450 (all in cm$^{-1}$),
peak 19, range: 1465-1480, peak 1473 (all in cm$^{-1}$), and
peak 20, range: 1520-1578, peak 1549 (all in cm$^{-1}$).

Evaluating and adjusting culture component levels in a culture medium

In one aspect, the disclosure provides methods for evaluating a culture component level in a culture medium. As used herein, the term "level" refers to an amount or concentration of a molecule entity, chemical species, component, or object. In one aspect, the disclosure provides methods for adjusting a culture component level in a culture medium. In some embodiments, the culture component is glucose.

The production of biological products, such as therapeutic proteins, by biological processes has been used for many years. However, controlling the composition of the culture medium remains challenging especially for large scale and continuous production methods. A problem of sub-optimal titer has been described by the Crabtree effect and higher level analogs, e.g., a situation in which cell culture cells are exposed to high levels of glucose and oxidative phosphorylation is inhibited and cellular processes become stunted due to the stressful nature of the environment (Thomson J M, Gaucher E A, Burgan M F, De Kee D W, Li T, Aris J P, Benner S A. (2005). "Resurrecting ancestral alcohol dehydrogenases from yeast." Nat Genet. 37 (6): 630-635). The Crabtree effect (as well as mammalian analogs) is seen as an acceptable tradeoff for the nutrient-deficiency safety buffer offered by high levels of glucose in a bolus feed strategy. A second issue is one of highly variable nutrient levels leading to erratic protein glycosylation, sialylation as well as other key product quality attributes. The effects of inconsistent cell culture environments on product quality attributes have been described previously (Castilho, Leda dos Reis. Animal cell technology: from biopharmaceuticals to gene therapy. 2008. Taylor and Francis Group. P138; Peifeng Chen, Sarah W. Harcum, Effects of elevated ammonium on glycosylation gene expression in CHO cells, Metabolic Engineering, Volume 8, Issue 2, March 2006, Pages 123-132).

A feed strategy of daily bolus feeds (fed-batch) provides a conservative but sub-optimal approach to cellular productivity and product quality. The drawback to this conservative approach is two-fold. First, to ensure that the culture is not depleted of nutrients in between data points, certain nutrients are kept at safe, high levels. These variable levels, of glucose for example, may limit the batch productivity and consistency. By controlling these nutrient levels at a consistent concentration throughout the run, the individual cell ultimately receives a stable level of feed/nutrients. The second drawback is that a single daily feed is designed to have all of the nutrients that the culture needs to sustain it until the next feed. Because this is fed into the system over a relatively short period of time (less than 1 hour) it causes substantial swings in the nutrient levels that the cells are exposed to. This leads to inconsistencies in the product quality output of the cells. Another challenge of current methods is the sampling requirement to determine the levels of components (e.g., nutrients, metabolites). Sampling is a main source for labor and contamination.

In one aspect, the disclosure provides methods for evaluating and adjusting a culture component level in a culture medium that addresses challenges associated with current methods of biological production.

In one aspect, the disclosure provides methods of evaluating a culture component level in a culture medium. In some embodiments, methods provided herein comprise obtaining a Raman spectrum of a culture medium, parsing the Raman spectrum with a Raman signature of the culture component to identify peaks corresponding the culture component, and measuring the intensity of the identified peaks to evaluate the culture component level in the medium. In some embodiments, methods provided herein further comprises adjusting the culture component level if the level is outside a predetermined range. In some embodiments, the culture component is glucose.

An element of methods provided herein is obtaining a Raman spectrum of the culture medium and parsing the Raman spectrum with the Raman signature of a culture component of interest (e.g., glucose). In some embodiments, a wide range Raman spectrum is obtained from the culture medium (e.g., including all or many of the wavelengths that are associated with Raman spectroscopy of components of culture mediums). However, in some embodiments, only narrow regions of the Raman spectrum that correspond to the Raman signature of the component of interest are obtained and/or interrogated. In some embodiments, multiple Raman spectra are obtained from different locations within a culture medium. The data from such multiple spectra may be averaged if appropriate.

In addition, in some embodiments, the intensity of a Raman spectra will be evaluated to determine the level of the culture component in a sample. In some embodiments, the intensity of a Raman spectra is evaluated only within one or more peaks of the spectra that correspond to a Raman signature to determine the level of the culture component in a sample. Thus, in some embodiments, only signature peaks need to be evaluated, and the intensity of an entire Raman spectra does not need to be evaluated Alternatively, or in addition, the Raman spectra may be parsed with Raman signatures associated with a specific level of the culture component of interest in culture medium. In some embodiments, the culture component is glucose and the Raman spectrum of the culture medium is parsed with the Raman signature of glucose in culture medium. In some embodiments, the intensity of the Raman spectra will be evaluated to determine the level of glucose in the sample. Alternatively, or in addition, the Raman spectra may be parsed with Raman signatures associated with a specific level of glucose in culture medium. In some embodiments, the Raman spectrum is parsed with one or more of the following Raman signatures:

1) a Raman signature of glucose comprising at least 4 peaks in the 200 $cm^{-1}$ to 3400 $cm^{-1}$ wavenumber range. In some embodiments, the 4 peaks are selected from the following 6 peaks:
   peak 1, range: 364-440, peak 402 (all in $cm^{-1}$),
   peak 2, range: 511-543, peak 527 (all in $cm^{-1}$),
   peak 3, range: 577-600, peak 589 (all in $cm^{-1}$),
   peak 4, range: 880-940, peak 911 (all in $cm^{-1}$),
   peak 5, range: 1130-1180, peak 1155 (all in $cm^{-1}$), and
   peak 6, range: 1262-1290, peak 1276 (all in $cm^{-1}$).

2) a Raman signature of glucose comprising at least 6 peaks in the 200 $cm^{-1}$ to 3400 $cm^1$ wavenumber range. In some embodiments, the 6 peaks are:
   peak 1, range: 364-440, peak 402 (all in $cm^{-1}$),
   peak 2, range: 511-543, peak 527 (all in $cm^{-1}$),
   peak 3, range: 577-600, peak 589 (all in $cm^{-1}$),
   peak 4, range: 880-940, peak 911 (all in $cm^{-1}$),
   peak 5, range: 1130-1180, peak 1155 (all in $cm^{-1}$), and
   peak 6, range: 1262-1290, peak 1276 (all in $cm^{-1}$).

3) a Raman signature of glucose comprising at least 10 peaks in the 200 $cm^{-1}$ to 3400 $cm^{-1}$ wavenumber range. In some embodiments, the 10 peaks are:
   peak 1, range: 364-440, peak 402 (all in $cm^{-1}$),
   peak 2, range: 511-543, peak 527 (all in $cm^{-1}$),
   peak 3, range: 577-600, peak 589 (all in $cm^{-1}$),
   peak 4, range: 749-569, peak 759 (all in $cm^{-1}$),
   peak 5, range: 880-940, peak 911 (all in $cm^{-1}$),
   peak 6, range: 1050-1070, peak 1060 (all in $cm^{-1}$),
   peak 7, range: 1110-1140, peak 1125 (all in $cm^{-1}$),
   peak 8, range: 1130-1180, peak 1155 (all in $cm^{-1}$),
   peak 9, range: 1262-1290, peak 1276 (all in $cm^{-1}$), and
   peak 10, range: 1520-1578, peak 1549 (all in $cm^{-1}$).

4) a Raman signature of glucose comprising at least 20 peaks in the 200 $cm^{-1}$ to 3400 $cm^{-1}$ wavenumber range. In some embodiments, the 20 peaks are:
   peak 1, range: 364-440, peak 402 (all in $cm^{-1}$),
   peak 2, range: 511-543, peak 527 (all in $cm^{-1}$),
   peak 3, range: 577-600, peak 589 (all in $cm^{-1}$),
   peak 4, range: 720-740, peak 732 (all in $cm^{-1}$),
   peak 5, range: 769-799, peak 789 (all in $cm^{-1}$),
   peak 6, range: 835-875, peak 855 (all in $cm^{-1}$),
   peak 7, range: 880-940, peak 911 (all in $cm^{-1}$),
   peak 8, range: 950-1015, peak 968 (all in $cm^{-1}$),
   peak 9, range: 1050-1070, peak 1060 (all in $cm^{-1}$),
   peak 10, range: 1063-1080, peak 1073 (all in $cm^{-1}$),
   peak 11, range: 1110-1140, peak 1125 (all in $cm^{-1}$),
   peak 12, range: 1130-1180, peak 1155 (all in $cm^{-1}$),
   peak 13, range: 1190-1240, peak 1210 (all in $cm^{-1}$),
   peak 14, range: 1262-1290, peak 1276 (all in $cm^{-1}$),
   peak 15, range: 1330-1342, peak 1336 (all in $cm^{-1}$),
   peak 16, range: 1350-1380, peak 1371 (all in $cm^{-1}$),
   peak 17, range: 1390-1410, peak 1401 (all in $cm^{-1}$),
   peak 18, range: 1425-1475, peak 1450 (all in $cm^{-1}$),
   peak 19, range: 1465-1480, peak 1473 (all in $cm^{-1}$), and
   peak 20, range: 1520-1578, peak 1549 (all in $cm^{-1}$).

In one aspect, methods of evaluating a culture component level in a culture medium comprise adjusting the glucose level if the level is outside a predetermined range. In some embodiments, methods further comprise adjusting the glucose level if the level is outside a range of 0.5-12 g/L, 1-3 g/L, 1-5 g/L, or 1-10 g/L. In some embodiments, the glucose level may be increased if the level is below a reference or threshold level, such as below 0.01 g/L, 0.1 g/L, 0.5 g/L, 1 g/L, 2.5 g/L, or 5 g/L. In some embodiments, the glucose level may be decreased if the level is above a reference or threshold level, such as above 3 g/L, 5 g/L, 10 g/L or 12 g/L. It should be appreciated that the optimal glucose level will depend on the nature of the production method, the type of cells, the duration of the production, the size of the production vessel, etc. However, a person of ordinary skill in the art can determine an optimal or desired range of glucose for a particular configuration. Determining that a level of glucose is outside this range (e.g., if glucose levels are too low) can be used as a trigger to adjust the glucose concentration. In some embodiments, methods further comprise adjusting the glucose level if the level is outside a range of 0.1-100 g/L, 0.2-50 g/L, 0.5-10 g/L, 1-5 g/L, or 1-3 g/L. In some embodiments, methods further comprise adjusting the glucose level if the level of glucose falls below 1 g/L. In some embodiments, methods further comprise adjusting the glucose level if the level of glucose falls below 3 g/L, 2 g/L, 1 g/L, 0.5 g/L, or lower. It should be appreciated that peak signatures and intensities that are used as references can be established for different concentrations of a compound of interest (e.g., glucose) and then used to determine the concentration of the compound of interest.

In one aspect, methods of evaluating a culture component level in a culture medium further comprise evaluating an additional culture parameter. In some embodiments, an additional culture parameter is one or more of the following culture parameters: viable cell density, level of lactate, level of glutamine, level of glutamate, level of ammonium, osmolality, or pH. It should be appreciated that the additional parameters may be determined by any method, for instance, pH may be determined by a pH meter or a coloring agent, while viable cell density may be determined by non-Raman spectroscopic methods. In some embodiments, the one or more culture parameters are determined by Raman spectroscopy. In some embodiments, evaluating the level of glucose and the one or more culture parameters is done simultaneously.

In one aspect, methods of evaluating a culture component level in a culture medium are provided that comprise adjusting the glucose level if the level is outside a predetermined combination of ranges of glucose level and the one or more culture parameters. In some embodiments, the glucose level is adjusted if the level is outside a range of 1-3 g/L. In some embodiments, methods of evaluating a culture component level in a culture medium comprise adjusting the one or more culture parameters if the one or more culture parameters are outside a predetermined combination of ranges of glucose level and the one or more culture parameters. It should be appreciated that methods provided herein allow for evaluation of and, the subsequent adjustment of, the level of glucose and additional parameters if such levels fall outside a predetermined range. The ranges of glucose and the one or more additional parameters can be set independently, or in combination. For instance, a level of glucose of 1-2 g/L may be desired if the viable cell density is at or below a reference level. However, a level of glucose of 2-3 g/L may be desired if the viable cell density is above a reference level. For example, a reference density may be $1\times10^4$ cells/mL, $5\times10^4$ cells/mL, $1\times10^5$ cells/mL, $5\times10^5$ cells/mL, $1\times10^6$ cells/mL, $5\times10^6$ cells/mL, $1\times10^6$ cells/mL, $5\times10^6$ cells/mL, In this example, the desired level of glucose depends on additional cell culture parameters, and both the level of glucose and the level of the additional parameter (e.g., viable cell density) are evaluated prior to making a decision on the adjustment of the level of glucose (or an additional parameter, such as the level of ammonium). It should further be appreciated that algorithms may be used that can aid in determining, or determine, if a level needs to be adjusted. For instance, Partial Least Squares (PLS) statistical methods can be used to build the correlations into predictive models. In some embodiments, the predictive models take into account the levels of glucose and viable cell density predictions and can be used to calculate the GUR (glucose uptake rate) of the system. The GUR is used to predict glucose consumption and therefore determine how much nutrient feed is required to maintain the system around a given set point.

In some embodiments of methods provided herein, the level of glucose and the one or more culture parameters are evaluated on an continuing basis, and the level of glucose and/or the one or more culture parameters are adjusted if the level of glucose and/or the one or more culture parameters are outside a predetermined combination of ranges of glucose level and the one or more culture parameters. In some embodiments, the level of glucose and the additional parameters are evaluated every hour. Monitoring on a continuing basis includes continuous monitoring and/or monitoring at regular intervals (e.g., once per minute, once per hour, twice per hour, daily, weekly, monthly, etc.)

It should be appreciated that methods provided herein allow for a feedback loop. In some embodiments, the level of glucose and, optionally, one or more additional parameters is determined and if the level of glucose and, optionally, one or more additional parameters is found to be unsatisfactory, the level of glucose and, optionally, one or more additional parameters is adjusted. In some embodiments, the adjustment is done automatically. For instance, if the level of glucose is evaluated and found to be too low, a pump may be activated that adds additional glucose to the culture medium. The monitoring of the levels of glucose and, optionally, one or more additional parameters may be done continuously. In some embodiments, the level of glucose and the additional parameters are evaluated continuously (multiple time within one minute), every minute, every 2 minutes, every 3 minutes, every 5 minutes, every 10 minutes, every 20 minutes, every 30 minutes, every hour, every 2 hours, or less frequently.

In one aspect, the disclosure provides an automated feedback system with one or more of the following elements: A data management system that uses the following information flow to drive automation:

Constituent concentration>>Laser wavenumber shift>>Raman collection system>>Raw Raman spectra>>Model application system>>Predicted Raman value>>Consumption calculation (within bioreactor interface)>>Feed required for maintenance>>Change in feed (via pump speed, weight change, etc.)>>Change in constituent concentration For instance, a culture component (e.g., glucose) is measured using Raman, the raw data is collected by the Raman system and transmitted to a model application system. Within the model application system the data treatments of the predictive PLS model are applied to raw spectra and the peaks are analyzed giving a predicted culture component value. The prediction is sent to the bioreactor interface which uses it to as an input for an algorithm which determines the consumption rate of the constituent and calculates the rate at which a feed must be added in order to maintain a specific concentration. The calculated pump speed will change the addition rate which will increase or decrease the concentration of the culture component as needed.

Raman Spectroscopy of Culture Medium

In one aspect, the disclosure provides methods that include an element of obtaining a Raman spectrum. In some embodiments, the disclosure provides methods that include an element of obtaining a Raman spectrum in a non-interfering or minimally-interfering solution, such as water. In some embodiments, the disclosure provides methods that include an element of obtaining a Raman spectrum in culture medium.

Raman spectroscopy relies on the inelastic scattering observed when a photon is impinged upon a chemical bond. The Raman equipment fires photons of a specific wavelength (energy level) at a target to be analyzed. When the photons enter the electron cloud of the chemical bond they are converted into energy and then back into photons and ejected from the bond. With inelastic scattering, the photon loses energy in the form of a wavelength shift. This wavelength shift is measured by the Raman system and the frequency of occurrence for all shifts is added to generate peaks (resulting in a Raman spectrum). These peaks, which represent a count of Raman shifts at a given energy, can be correlated to specific constituents in the system. In some embodiments, the intensities of one or more peaks can be used to determine the concentration of a component in a solution (e.g., by comparing to a standard curve of intensities generated using known concentrations).

In some embodiments, the Raman spectroscopy may be performed in the visible, near infrared, infrared, near ultraviolet, or ultraviolet (UV) range. In some embodiments, a signal enhancement technique known as Surface Enhanced Raman Spectroscopy (SERS), which relies on a phenomenon known as surface plasmonic resonance, may be used. In some embodiments, resonance Raman spectroscopy, tip-enhanced Raman spectroscopy, polarized Raman spectroscopy, stimulated Raman spectroscopy, transmission Raman spectroscopy, spatially offset Raman spectroscopy, difference Raman spectroscopy, Fourier Transform (FT) Raman, or hyper Raman spectroscopy may be used. In some embodiments, a Raman analyzer can be used that is configured with a laser or other suitable light source that operates at appropriate wavelengths (e.g., 325 nm, 514.5 nm, 532 nm, 632.8 nm, 647 nm, 752 nm, 785 nm, 830 nm, 1064 nm, etc.)

In some embodiments, data fusion may be used to augment the spectroscopic analysis. For example, a second spectroscopic analysis (e.g., Nuclear Magnetic Resonance (NMR), X-Ray Fluorescence (XRF), Small Angle X-Ray Scattering (SAXS), Powder Diffraction, Near Infrared Spectroscopy (NIR), or Fourier Transform Infrared Spectroscopy (FTIR)) may be performed to obtain a second spectrum of a lot sample, and data fusion analysis may be used to evaluate the lot sample.

Evaluating Culture Media

In one aspect, the disclosure provides methods for the analysis of biological samples. In some embodiments, the disclosure provides methods for evaluating a biological production process. In some embodiments, the disclosure provides methods for evaluating a culture medium. In some embodiments, the disclosure provides methods for evaluating a culture component level in a culture medium.

In some embodiments, the analysis of a culture medium comprises determining the presence of one or more culture components in a biological sample. In some embodiments, the analysis of a biological sample comprises evaluating the level of a culture component. It should be appreciated that methods provided herein allow for the analysis of a wide variety of culture media and biological samples. Culture media and biological samples, as used herein, refer to media and samples that include one or more components (e.g., glucose) of a biological production process. For example, a biological process may be the production of one or more biological molecules in a cell production system. Biological molecules may be antibodies or other molecules (e.g., recombinant polypeptides). Components of a biological production process include sugars, amino acids, peptides, proteins, nucleic acids, etc.

In some embodiments, evaluating a culture medium includes evaluating the presence of one or more components (culture components) in a biological sample or culture medium. In some embodiments, evaluating a culture medium includes evaluating the level of one or more components in a biological sample. In some embodiments, the presence or level of one or more culture components can be correlated to the quality of the sample and/or the progress of a particular biological manufacturing process. Culture components that can be analyzed according to methods provided herein include sugars (e.g., glucose), amino acids, nucleic acid, etc. For instance, for an optimal biological production process it may be desired to have a specific level (e.g., concentration) of glucose to be present at the beginning of the biological production process. Determining the presence and/or the level of glucose than allows for evaluating a biological sample. Furthermore, as provided herein, if less than the desired level of glucose is present the level of glucose may be increased by the addition of glucose solution.

In some embodiments, a Raman spectroscope is configured inline with a bioreactor, vessel or fluid conduit of either one in order to non-invasively (e.g., in a sterile fashion) monitor and/or determine levels of culture components in the bioreactor or other vessel.

In some embodiments, the level of a component during the biological production process can be used to monitor the progress of the biological production process. Thus, for instance, if glucose is consumed during a biological production process, the presence of the same level of glucose during the progression of the biological production process as at the beginning of the biological production process is a sign that the bioprocess is not proceeding as desired. In addition, the presence of a new component can be a sign that the biological production process is proceeding in some embodiments, or not proceeding in other embodiments, as planned. Thus, a biological production process may be monitored for the occurrence of desired product or indicator that biological production process is progressing as desired. On the other hand, the presence of a particular metabolite may be a sign that cells in the biological production process are not generating the desired product but, for instance, are merely proliferating. Thus, determining the presence of one or more components in a biological sample is a way of evaluating the sample and predicting the successfulness (e.g., yield) of a biological production process.

It should be appreciated that the component analysis can also be expanded to multiple components. Thus, for instance, a biological production process may require a particular ratio of glucose to glutamate to proceed optimally. A sample may be monitored prior to or throughout the reaction for this relationship and the conditions may be adjusted if the observed ratio deviates from the desired ratio.

In one aspect, the disclosure provides methods for evaluating a biological sample by generating a reference library of Raman signatures of culture components that are associated with a sample with a particular outcome (e.g., if a particular component is not aggregated or oxidized). For instance, Raman signatures can be generated from components in samples that are known to result in a biological production process with a good yield and Raman signatures can be generated from samples that are associated with a low yield (e.g., where the Raman spectrum would show undesired degradation of a particular component). A Raman spectrum can subsequently be taken from an unknown sample and be parsed with the library of Raman signatures In some embodiments, the herein-described models and Raman spectra collected from culture medium may be used to optimize the culture medium for biological production. The cell growth may be, for example, for protein production (e.g., for antibody production, for example for humanized antibody production). In some embodiments, cell growth may be that of a recombinant cell (e.g., bacterial, yeast, mammalian or other cell type) that expresses a protein of interest. In some embodiments, a protein of interest may be, but is not limited to, anti-LINGO, anti-LINGO-1, interferon (e.g., interferon beta 1a-AVONEX), Abciximab (REOPRO®), Adalimumab (HUMIRA®), Alemtuzumab (CAMPATH®), Basiliximab (SIMULECT®), Bevacizumab (AVASTIN®), Cetuximab (ERBITUX®), Certolizumab pegol (CIMZIA®), Daclizumab (ZENAPAX®), Eculizumab (SOLIRIS®), Efalizumab (RAPTIVA®), Gemtuzumab (MYLOTARG®), Ibritumomab tiuxetan (ZEVALIN®), Infliximab (REMICADE®), Muromonab-CD3 (ORTHOCLONE OKT3®), Natalizumab (TYSABRI®), Omalizumab (XOLAIR®), Palivizumab (SYNAGIS®), Panitumumab (VECTIBIX®), Ranibizumab (LUCENTIS®), Rituximab (RITUXAN®), Tositumomab (BEXXAR®), and/or Trastuzumab (HERCEPTIN®). In some embodiments, the protein of interest is Natalizumab (TYSABRI®). In some embodiments, the protein of interest is a blood cascade protein. Blood cascade proteins are known in the art and include, but are not limited to, Factor VII, tissue factor, Factor IX, Factor X, Factor XI, Factor XII, Tissue factor pathway inhibitor, Factor V, prothrombin, thrombin, vonWillebrandFactor, kininigen, prekallikrien, kallikrein, fribronogen, fibrin, protein C, thrombomodulin, and antithrombin. In some embodiments, the blood cascade protein is Factor IX or Factor VIII. It should be appreciated that methods provided herein are also applicable for uses involving the production of versions of blood cascade proteins, including blood cascade proteins that are covalently bound to antibodies or antibody fragments, such as Fc. In some embodiments, the blood cascade protein is Factor IX-Fc (FIXFc) or Factor VIII-Fc (FVIIIFc). In some embodiments, one or more proteins of interest are hormones, regulatory proteins and/or neurotrophic factors. Neurotrophic factors are known in the art and include nerve growth factor (NGF), brain-derived neurotrophic factor (BDNF), neurotrophin-3 (NT-3), neurotrophin-4 (NT-4), members of the glial cell line-derived neurotrophic factor ligands (GDNF) and ciliary neurotrophic factor (CNTF). In some embodiments, the protein of interest is neublastin.

In some embodiments, a protein of interest may be, but is not limited to, Abagovomab, Abciximab, Actoxumab, Adalimumab, Adecatumumab, Afelimomab, Afutuzumab, Alacizumab pegol, ALD, Alemtuzumab, Alirocumab, Altumomab pentetate, Amatuximab, Anatumomab mafenatox, Anrukinzumab, Apolizumab, Arcitumomab, Aselizumab, Atinumab, Atlizumab, Atorolimumab, Bapineuzumab, Basiliximab, Bavituximab, Bectumomab, Belimumab, Benralizumab, Bertilimumab, Besilesomab, Bevacizumab, Bezlotoxumab, Biciromab, Bimagrumab, Bivatuzumab mertansine, Blinatumomab, Blosozumab, Brentuximab vedotin, Briakinumab, Brodalumab, Canakinumab, Cantuzumab mertansine, Cantuzumab ravtansine, Caplacizumab, Capromab pendetide, Carlumab, Catumaxomab, Cedelizumab, Certolizumab pegol, Cetuximab, Citatuzumab bogatox, Cixutumumab, Clazakizumab, Clenoliximab, Clivatuzumab tetraxetan, Conatumumab, Concizumab, Crenezumab, Dacetuzumab, Daclizumab, Dalotuzumab, Daratumumab, Demcizumab, Denosumab, Detumomab, Dorlimomab aritox, Drozitumab, Duligotumab, Dupilumab, Dusigitumab, Ecromeximab, Eculizumab, Edobacomab, Edrecolomab, Efalizumab, Efungumab, Eldelumab, Elotuzumab, Elsilimomab, Enavatuzumab, Enlimomab pegol, Enokizumab, Enoticumab, Ensituximab, Epitumomab cituxetan, Epratuzumab, Erlizumab, Ertumaxomab, Etaracizumab, Etrolizumab, Evolocumab, Exbivirumab, Fanolesomab, Faralimomab, Farletuzumab, Fasinumab, FBTA, Felvizumab, Fezakinumab, Ficlatuzumab, Figitumumab, Flanvotumab, Fontolizumab, Foralumab, Foravirumab, Fresolimumab, Fulranumab, Futuximab, Galiximab, Ganitumab, Gantenerumab, Gavilimomab, Gemtuzumab ozogamicin, Gevokizumab, Girentuximab, Glembatumumab vedotin, Golimumab, Gomiliximab, Guselkumab, Ibalizumab, Ibritumomab tiuxetan, Icrucumab, Igovomab, Imciromab, Imgatuzumab, Inclacumab, Indatuximab ravtansine, Infliximab, Intetumumab, Inolimomab, Inotuzumab ozogamicin, Ipilimumab, Iratumumab, Itolizumab, Ixekizumab, Keliximab, Labetuzumab, Lampalizumab, Lebrikizumab, Lemalesomab, Lerdelimumab, Lexatumumab, Libivirumab, Ligelizumab, Lintuzumab, Lirilumab, Lodelcizumab, Lorvotuzumab mertansine, Lucatumumab, Lumiliximab, Mapatumumab, Margetuximab, Maslimomab, Mavrilimumab, Matuzumab, Mepolizumab, Metelimumab, Milatuzumab, Minretumomab, Mitumomab, Mogamulizumab, Morolimumab, Motavizumab, Moxetumomab pasudotox, Muromonab-CD, Nacolomab tafenatox, Namilumab, Naptumomab estafenatox, Narnatumab, Natalizumab, Nebacumab, Necitumumab, Nerelimomab, Nesvacumab, Nimotuzumab, Nivolumab, Nofetumomab merpentan, Ocaratuzumab, Ocrelizumab, Odulimomab, Ofatumumab, Olaratumab, Olokizumab, Omalizumab, Onartuzumab, Oportuzumab monatox, Oregovomab, Orticumab, Otelixizumab, Oxelumab, Ozanezumab, Ozoralizumab, Pagibaximab, Palivizumab, Panitumumab, Panobacumab, Parsatuzumab, Pascolizumab, Pateclizumab, Patritumab, Pemtumomab, Perakizumab, Pertuzumab, Pexelizumab, Pidilizumab, Pinatuzumab vedotin, Pintumomab, Placulumab, Polatuzumab vedotin, Ponezumab, Priliximab, Pritoxaximab, Pritumumab, Quilizumab, Racotumomab, Radretumab, Rafivirumab, Ramucirumab, Ranibizumab, Raxibacumab, Regavirumab, Reslizumab, Rilotumumab, Rituximab, Robatumumab, Roledumab, Romosozumab, Rontalizumab, Rovelizumab, Ruplizumab, Samalizumab, Sarilumab, Satumomab pendetide, Secukinumab, Seribantumab, Setoxaximab, Sevirumab, Sibrotuzumab, Sifalimumab, Siltuximab, Simtuzumab, Siplizumab, Sirukumab, Solanezumab, Solitomab, Sonepcizumab, Sontuzumab, Stamulumab, Sulesomab, Suvizumab, Tabalumab, Tacatuzumab tetraxetan, Tadocizumab, Talizumab, Tanezumab, Taplitumomab paptox, Tefibazumab, Telimomab aritox, Tenatumomab, Teneliximab, Teplizumab, Teprotumumab, TGN, Ticilimumab , Tildrakizumab, Tigatuzumab, TNX-, Tocilizumab , Toralizumab, Tositumomab, Tovetumab, Tralokinumab, Trastuzumab, TRBS, Tregalizumab, Tremelimumab, Tucotuzumab celmoleukin, Tuvirumab, Ublituximab, Urelumab, Urtoxazumab, Ustekinumab, Vantictumab, Vapaliximab, Vatelizumab, Vedolizumab, Veltuzumab, Vepalimomab, Vesencumab, Visilizumab, Volociximab, Vorsetuzumab mafodotin, Votumumab, Zalutumumab, Zanolimumab, Zatuximab, Ziralimumab and/or Zolimomab aritox.

Computer Implementations

It should be appreciated that methods disclosed herein may be implemented in any of numerous ways. For example, certain embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a smart phone, tablet, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools (e.g., MATLAB), and also may be compiled as executable machine language code or intermediate code that is executed on a framework or virtual machine.

In this respect, aspects of the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with information (e.g., Raman signature information) and/or one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (e.g., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

As used herein, the term "database" generally refers to a collection of data arranged for ease and speed of search and retrieval. Further, a database typically comprises logical and physical data structures. Those skilled in the art will recognize methods described herein may be used with any type of database including a relational database, an object-relational database and an XML-based database, where XML stands for "eXtensible-Markup-Language". For example, Raman spectra information may be stored in and retrieved from a database. The Raman spectra information may be stored in or indexed in a manner that relates culture component levels (e.g., glucose levels) or bioreactor conditions, or with a variety of other relevant information.

Computer-executable instructions may be in many forms, such as program modules, executed by one or more computers or other devices. Generally, program modules include routines, programs, objects, components, data structures, etc. that perform particular tasks (e.g., tasks relating to Feedback control) or implement particular abstract data types. Typically the functionality of the program modules may be combined or distributed as desired in various embodiments.

The present invention is further illustrated by the following Examples, which in no way should be construed as further limiting. The entire contents of all of the references (including literature references, issued patents, published patent applications, and co-pending patent applications) cited throughout this application are hereby expressly incorporated by reference, in particular for the teaching that is referenced hereinabove.

EXAMPLES

Example 1

Generating a Raman Signature of Glucose

A 785 nm excitation laser is used to collect Raman spectra for glucose dissolved in water. The samples used to build the spectral library for the Raman signature of glucose cover a range of concentrations that represents a reasonable approximation of the experimental range in small but measurable increments, such as 0.1 g/L.

These data are analyzed with statistical software that can do multivariate analysis. After treating the data, derivatizing and normalizing as necessary, peaks emerge above the noise. These peaks represent the basis peaks for the molecule of interest (glucose). The spectra are correlated with the known concentration of the molecule of interest.

Regions are selected such that only the peaks of interest remain.

In a next step, Raman spectra are obtained for glucose dissolved in liquid media (cell culture media). When preparing solutions, the volume of the added glucose solution is maintained throughout the range of concentrations. This prevents dilution of the components in the media and distortion of the data. These data are analyzed with statistical software that can do multivariate analysis. After treating the data, derivatizing and normalizing as necessary, peaks emerge above the noise. These peaks represent the basis peaks for the molecule of interest (glucose). The spectra are correlated with the known concentration of the molecule of interest. In some embodiments, certain aspects of the spectra such as area or intensity of a peak or set of peaks are correlated with a concentration of the molecule of interest.

The spectra of glucose in media are now trimmed to match the previously chosen basis peaks, and the peaks in the new solution are inspected for alterations (peak distortions), including lateral shifts and inversions.

FIG. 1 depicts an example of a lateral peak shift. The tell-tale sign of a lateral peak shift is that it looks like a 2-dimensional peak has been stretched out of the page in the direction of the red arrows. This peak distortion is likely the result of a component in the media formulation that is interacting with one of the bonds on the molecule of interest.

Figure 2:
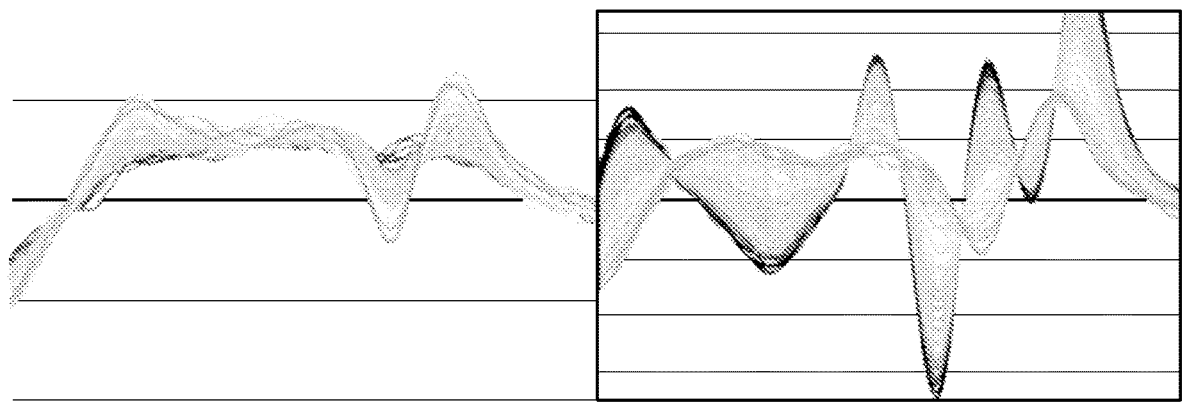
FIG. 2 is a non-limiting example of an inversion peak; basis peaks are shown on the left with the inversion peaks shown on the right; darker lines represent higher concentrations while lighter lines represent lower concentrations.

Similarly, FIG. 2 depicts an example of an inversion peak, or a peak where it appears that the lower concentration data is higher in magnitude than the high concentration data, when this relationship did not exist in the basis peaks. This type of distortion is usually due to a molecular species within the media that has similar vibrational properties and therefore similar peaks and the concentration of this other species is not included in the model.

Both laterally shifted peaks and inverted peaks should not be taken into account when generating the Raman signature. The regions that remain after the removal of the distorted peaks are used to generate the Raman signature. The regions are applied to model building using a larger cell culture dataset to build a predictive Partial Least Square model. All of the relevant cell culture spectra are included along with the corresponding offline data for the constituent of interest into a multivariate software package (e.g., SIMCA or the PLS Toolbox add-on for Matlab). Offline constituent data are collected through an appropriate analytical method for the constituent of interest.

Example 2

Raman Signature of Glucose for Culture Medium

A Raman signature of glucose for culture medium was created based on analysis and parsing of Raman spectra of glucose in water and Raman spectra of glucose in culture medium. The following peaks provide a Raman signature of glucose for culture medium:

peak 1, range: 364-440, peak 402 (all in $cm^{-1}$),
peak 2, range: 511-543, peak 527 (all in $cm^{-1}$),
peak 3, range: 577-600, peak 589 (all in $cm^{-1}$),
peak 4, range: 720-740, peak 732 (all in $cm^{-1}$),
peak 5, range: 769-799, peak 789 (all in $cm^{-1}$),
peak 6, range: 835-875, peak 855 (all in $cm^{-1}$),
peak 7, range: 880-940, peak 911 (all in $cm^{-1}$),
peak 8, range: 950-1015, peak 968 (all in $cm^{-1}$),
peak 9, range: 1050-1070, peak 1060 (all in $cm^{-1}$), peak 10, range: 1063-1080, peak 1073 (all in cm$^{-1}$),
peak 11, range: 1110-1140, peak 1125 (all in cm$^{-1}$),
peak 12, range: 1130-1180, peak 1155 (all in cm$^{-1}$),
peak 13, range: 1190-1240, peak 1210 (all in cm$^{-1}$),
peak 14, range: 1262-1290, peak 1276 (all in cm$^{-1}$),
peak 15, range: 1330-1342, peak 1336 (all in cm$^{-1}$),
peak 16, range: 1350-1380, peak 1371 (all in cm$^{-1}$),
peak 17, range: 1390-1410, peak 1401 (all in cm$^{-1}$),
peak 18, range: 1425-1475, peak 1450 (all in cm$^{-1}$),
peak 19, range: 1465-1480, peak 1473 (all in cm$^{-1}$),
peak 20, range: 1520-1578, peak 1549 (all in cm$^{-1}$).

A more limited set of peaks was also found to provide a Raman signature of glucose for culture medium:
peak 1, range: 364-440, peak 402 (all in cm$^{-1}$),
peak 2, range: 511-543, peak 527 (all in cm$^{-1}$),
peak 3, range: 577-600, peak 589 (all in cm$^{-1}$),
peak 4, range: 749-569, peak 759 (all in cm$^{-1}$),
peak 5, range: 880-940, peak 911 (all in cm$^{-1}$),
peak 6, range: 1050-1070, peak 1060 (all in cm$^{-1}$),
peak 7, range: 1110-1140, peak 1125 (all in cm$^{-1}$),
peak 8, range: 1130-1180, peak 1155 (all in cm$^{-1}$),
peak 9, range: 1262-1290, peak 1276 (all in cm$^{-1}$),
peak 10, range: 1520-1578, peak 1549 (all in cm$^{-1}$).

An even more limited set of peaks was also found to provide a Raman signature of glucose for culture medium:
peak 1, range: 364-440, peak 402 (all in cm$^{-1}$),
peak 2, range: 511-543, peak 527 (all in cm$^{-1}$),
peak 3, range: 577-600, peak 589 (all in cm$^{-1}$),
peak 4, range: 880-940, peak 911 (all in cm$^{-1}$),
peak 5, range: 1130-1180, peak 1155 (all in cm$^{-1}$),
peak 6, range: 1262-1290, peak 1276 (all in cm$^{-1}$).

Example 3

Automated Feedback Implementation

Figure 3:
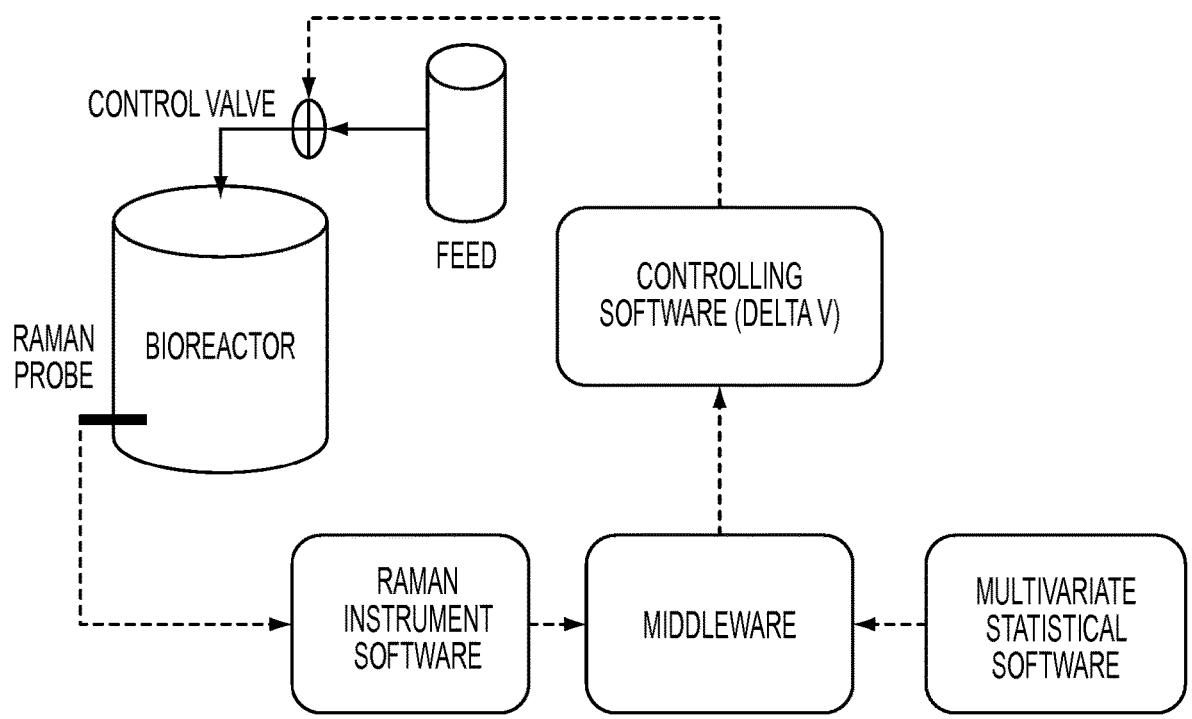
FIG. 3 is a non-limiting example of a medium bioreactor system configured with Raman monitoring and feedback control.

The data management system uses the following information flow to drive automation (hardware in bold):
Constituent concentration>>Laser wavenumber shift>>Raman collection system>>Raw Raman spectra>>Model application system>>Predicted Raman value>>Consumption calculation (within bioreactor interface)>>Feed required for maintenance>>Change in feed (via pump speed, weight change, etc.)>>Change in constituent concentration (See FIG. 3)

The Raman system is calibrated before use. The Raman data collection probe is inserted in a bioreactor following normal probe procedures, including cleaning and sterilization.

Data collection begins prior to inoculation but after media batching. A constituent concentration (glucose) is measured as a Raman shift. The raw data is subsequently collected by the Raman system and transmitted to the model application system. Within the model application system the data treatments of the predictive Partial Least Squire model is applied to raw spectra and the peaks are analyzed giving a predicted constituent value. The prediction is sent to the bioreactor interface which uses it as an input for an algorithm which determines the consumption rate of the constituent and calculates the rate at which a feed must be added in order to maintain a specific concentration. The calculated pump speed changes the addition rate which results in an increase or decrease in the concentration as needed.

Example 4

Feedback Implementation Using Glucose

Figure 8:
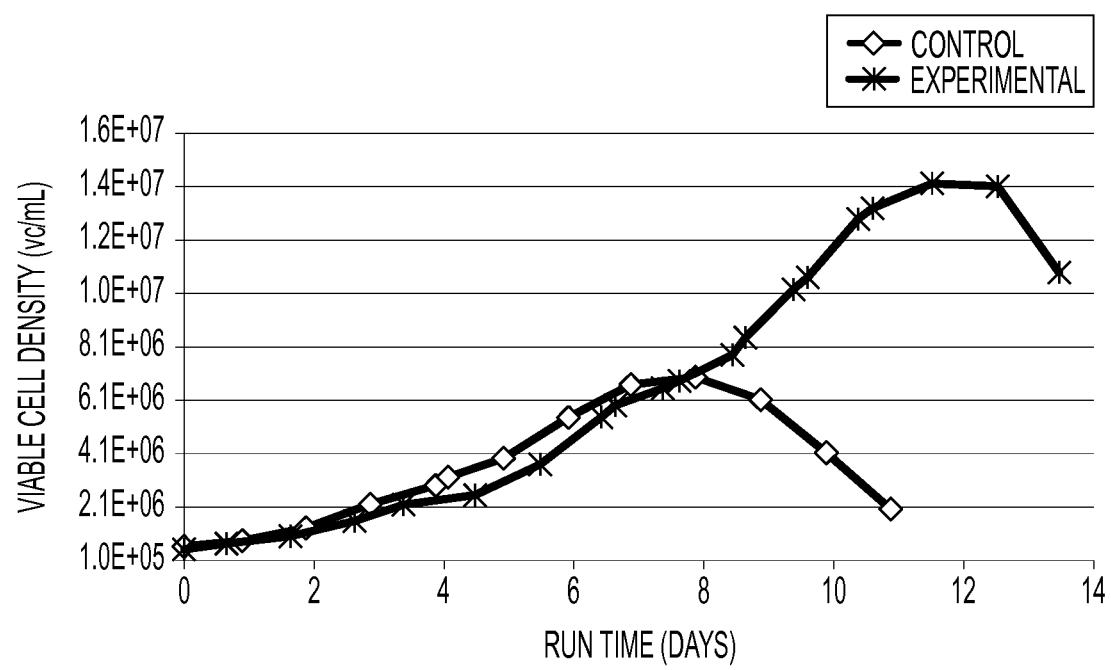
FIG. 8 is a non-limiting example of a plot showing viable cell density versus run time for experimental and control conditions.
Figure 9:
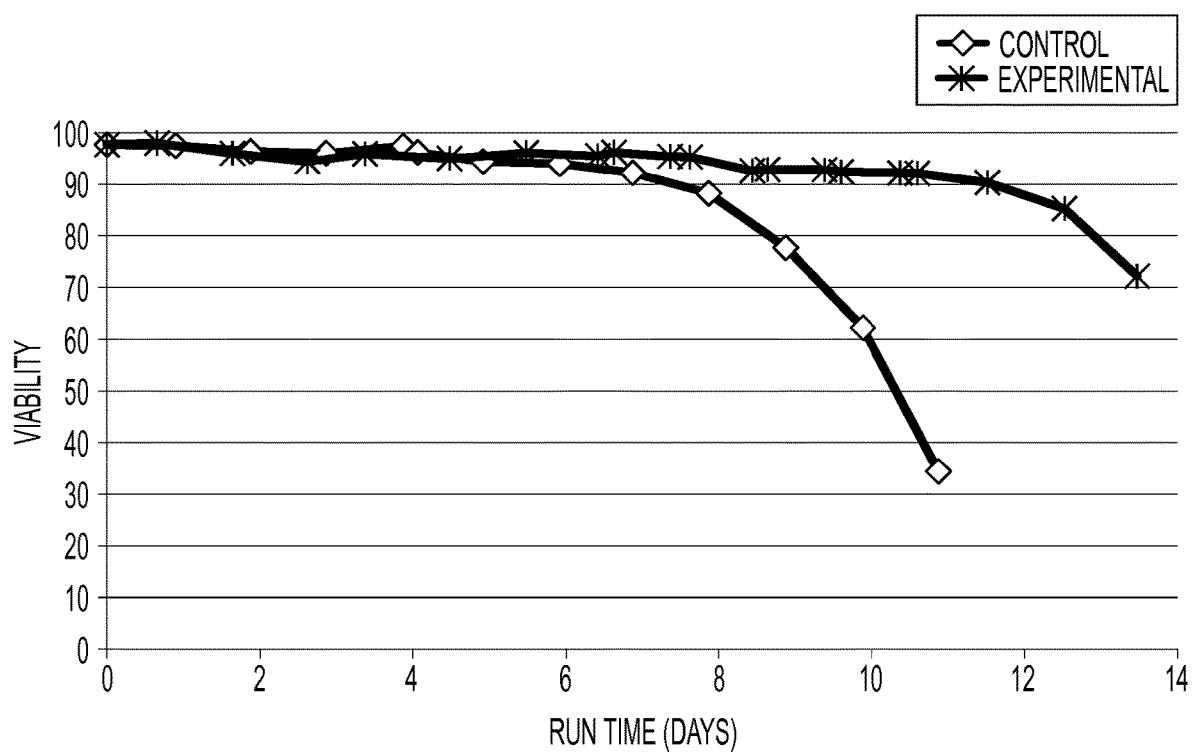
FIG. 9 is a non-limiting example of a plot showing percent viability versus run time for experimental and control conditions.
Figure 10:
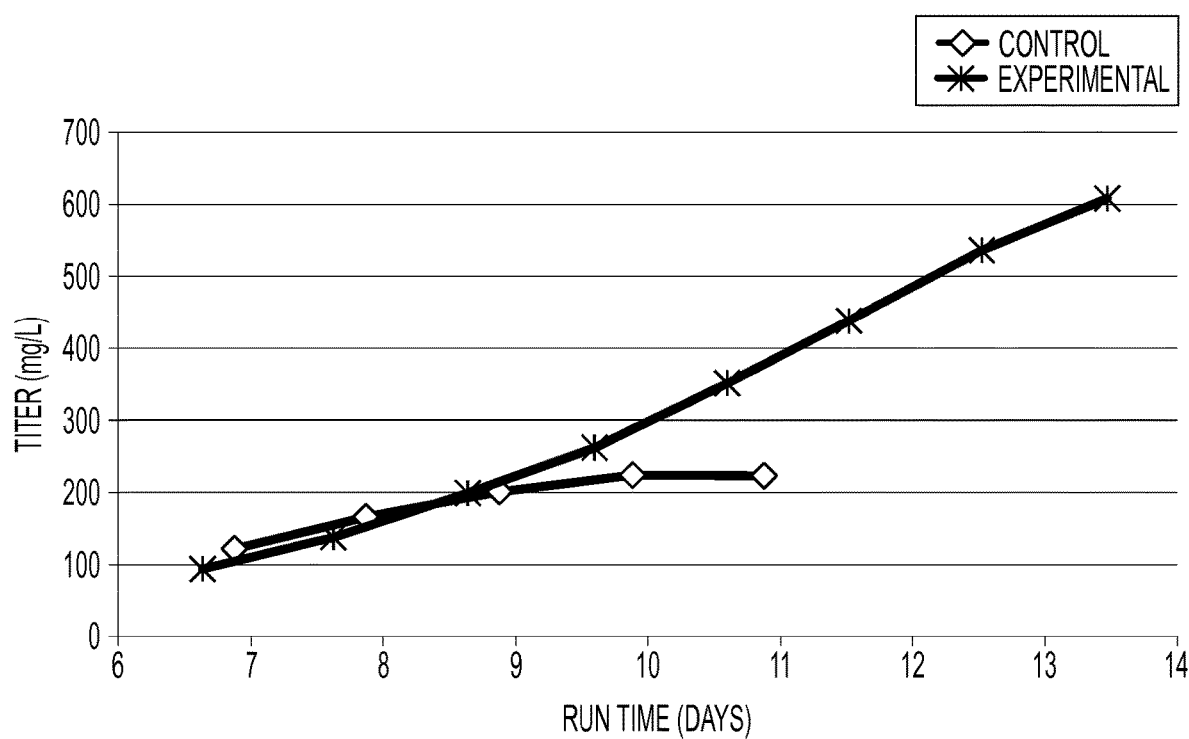
FIG. 10 is a non-limiting example of a plot showing titer production versus run time for experimental and control conditions.

Raman based feedback control was demonstrated in a recent 3 L glass bioreactor run. Raman spectra were fed into a model that generated a value for glucose. The model was run on an automated schedule and automated feed additions were made daily to maintain a pre-specified glucose target. It was possible to surpass growth trends of the platform fed-batch processes. FIG. 8 depicts the growth trends of the experimental and control conditions. Day 11 viable cell densities (VCD) were 2.06×10$^6$ and 12.9×10$^6$ for the control and experimental conditions respectively. Harvest VCDs were 2.06×10$^6$ and 10.9×10$^6$ for the control and experimental conditions respectively. Day 11 viability was 34% and 92% for the control and experimental conditions respectively (FIG. 9). The combination of higher VCD and higher cellular viability is strongly correlated with increased titer production. Comparing day 11 titer in both reactors shows a 57% increase in the experimental condition (FIG. 10). However, because the viability was sustained at a higher level for longer, the culture was extended by three days, allowing the VCD to peak at a significantly higher level (104% increase in experimental condition (FIG. 8)) and the titer was therefore able to increase beyond the 57% increase seen on day 11. The final titer in the experimental condition was 172% higher than the final titer in the control condition, and when the increased volume of the experimental condition is accounted for the total increase from the control to the experimental was 190%.

Figure 11:
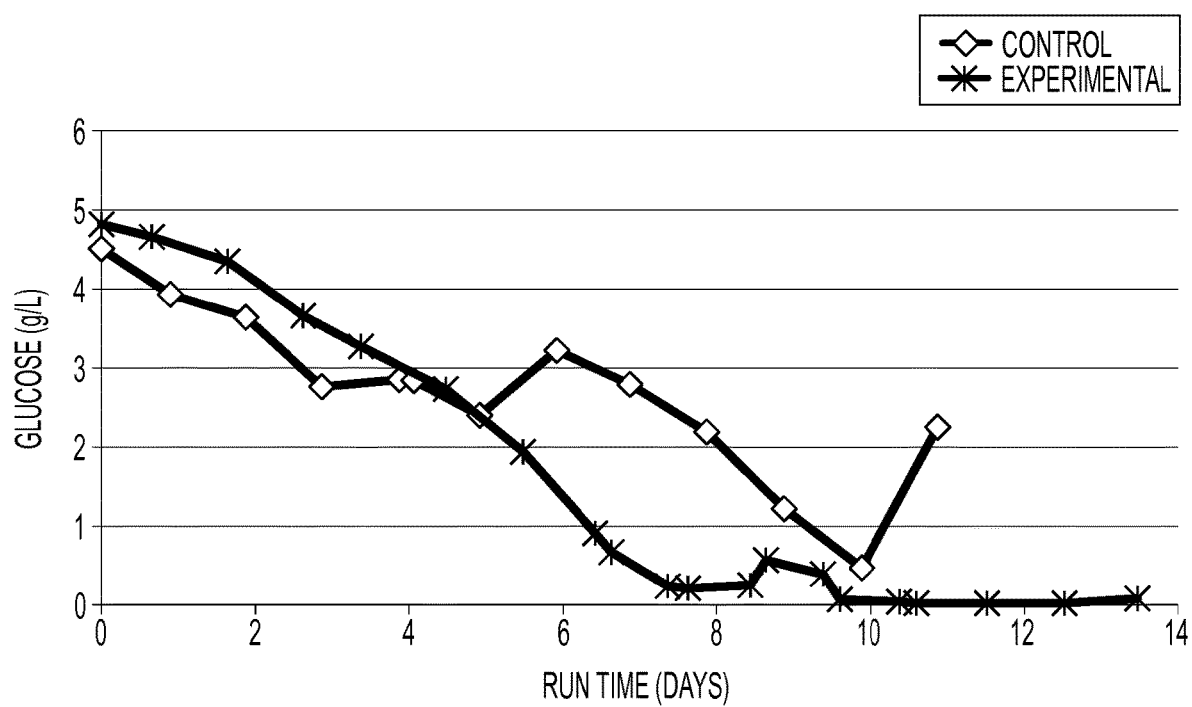
FIG. 11 is a non-limiting example of a plot showing glucose levels versus run time for experimental and control conditions.
Figure 12:
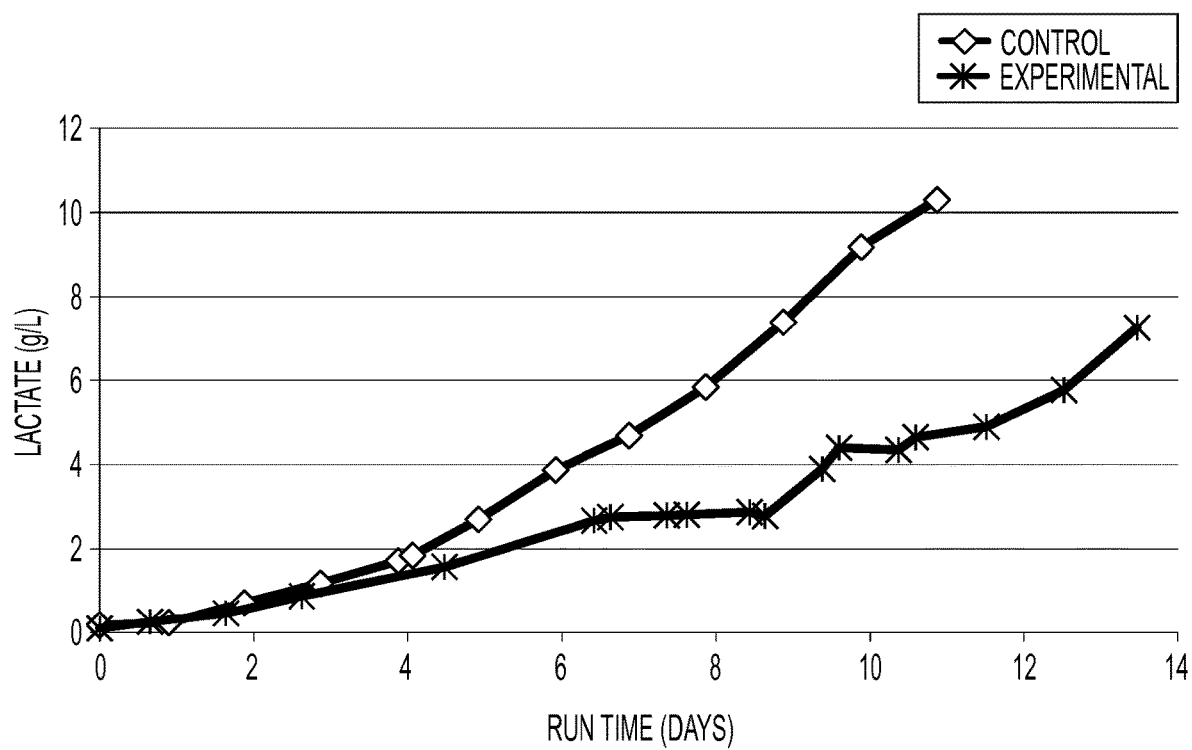
FIG. 12 is a non-limiting example of a plot showing lactate levels versus run time for experimental and control conditions.
Figure 13:
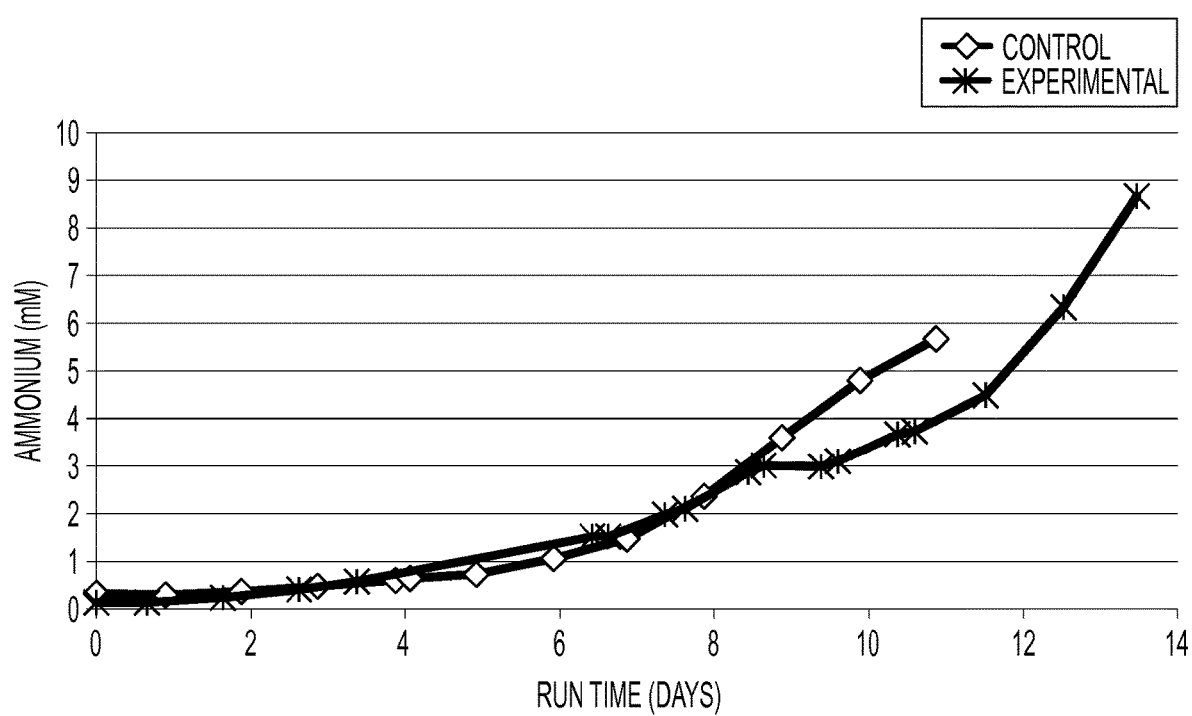
FIG. 13 is a non-limiting example of a plot showing ammonium levels versus run time for experimental and control conditions.
Figure 14:
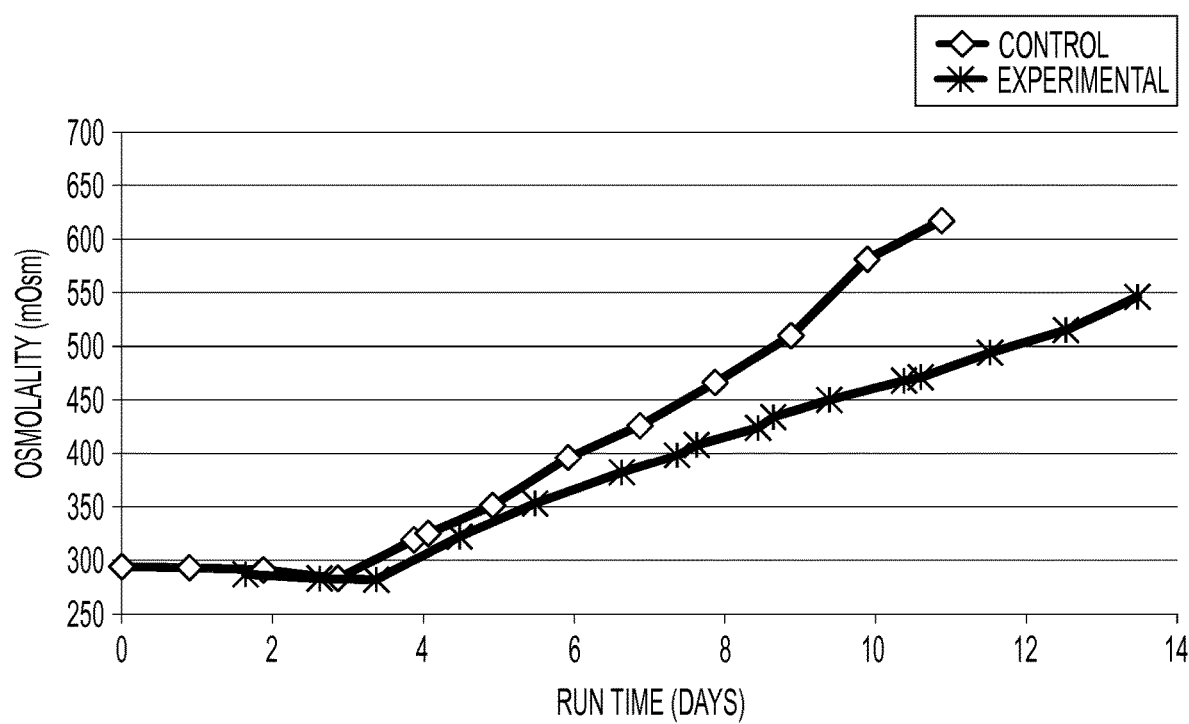
FIG. 14 is a non-limiting example of a plot showing osmolality versus run time for experimental and control conditions.

The glucose values are shown in FIG. 11. Other critical quality attributes (CQA) were impacted by the automated glucose control, including lactate (FIG. 12), ammonium (FIG. 13) and osmolality (FIG. 14). These CQAs are known to impact cellular productivity as well as product quality, and the data presented here indicate that Raman driven automated control is useful for controling metabolite levels.

Example 5

Feedback with Glucose and Additional Parameters

Raman spectroscopy and multivariate analysis is used to correlate changes in specific spectral regions (peaks) to changes in off line cell growth and metabolic characteristics. The corollary models function as the algorithm that drives the feedback control output.

Figure 4:
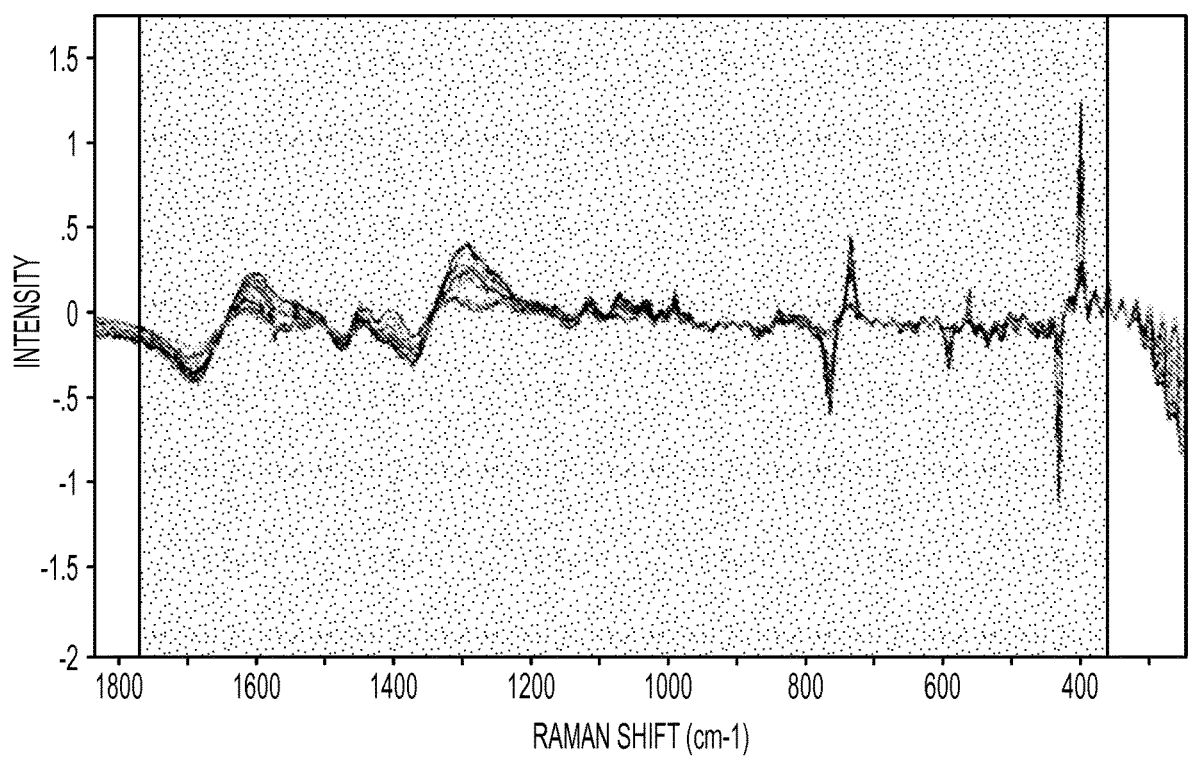
FIG. 4 is a non-limiting example of a Raman spectrum with 1$^{st}$ derivative pre-processing.
Figure 5:
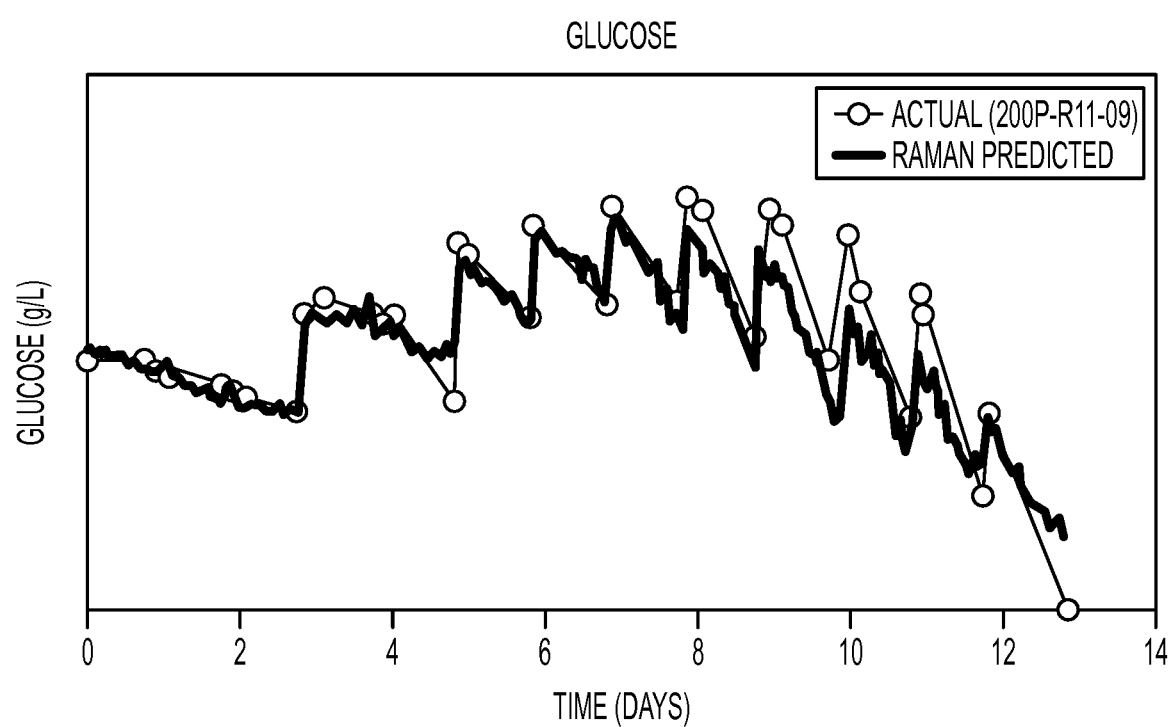
FIG. 5 is a non-limiting example of a plot showing actual and predicted (based on a Raman predictive model) glucose levels.
Figure 6:
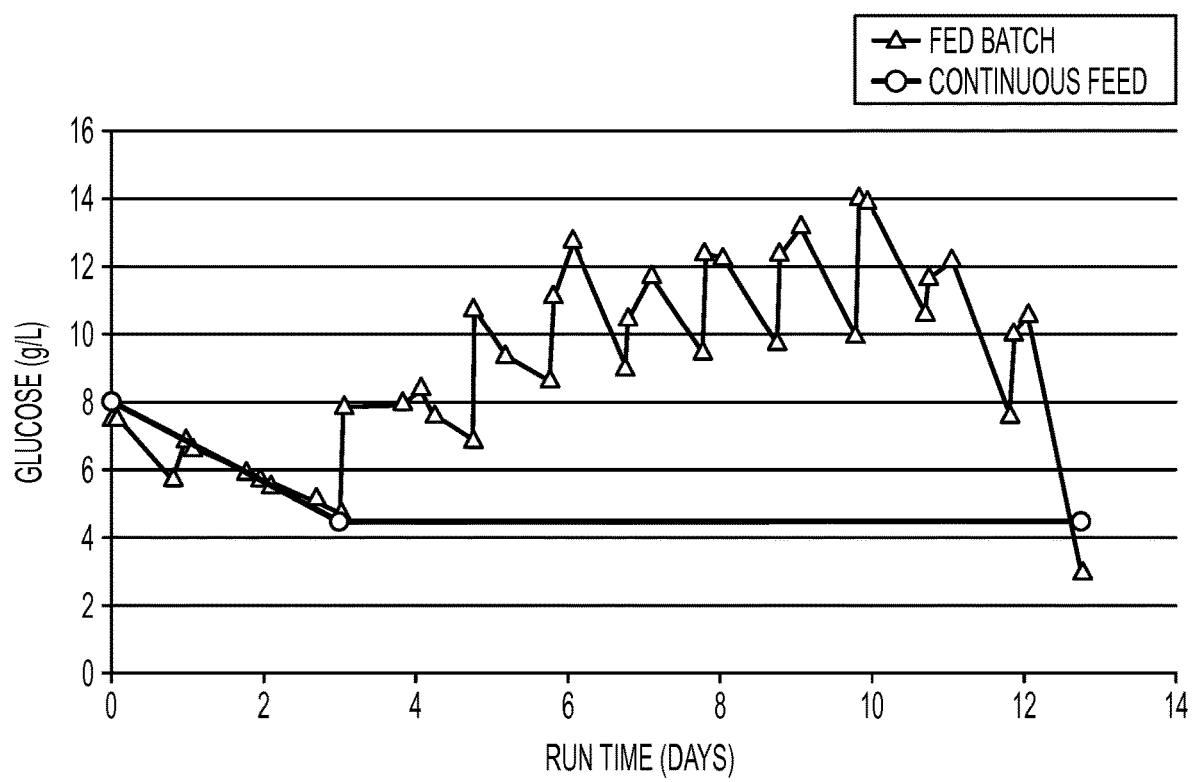
FIG. 6 is a non-limiting example of a plot showing glucose levels versus run time for bolus feeds (fed-batch) and continuous feed with feedback control.

A glucose Raman model is used along with a viable cell density (VCD) Raman model to calculate the glucose uptake rate (GUR) between two points (See FIG. 4). Both glucose and VCD values are derived via the Raman model near real time, e.g., every 15 or so minutes. In order to calculate the GUR, the data points chosen are sufficiently distanced, based on experimental data, to avoid inaccurate calculations due to signal noise. The Raman algorithm uses the GUR as an input to drive a signal output to the bioreactor controller system: open feed valves and turn on pump at required rate to maintain levels at a set point (See FIGS. 5 and 6).

Figure 7A:
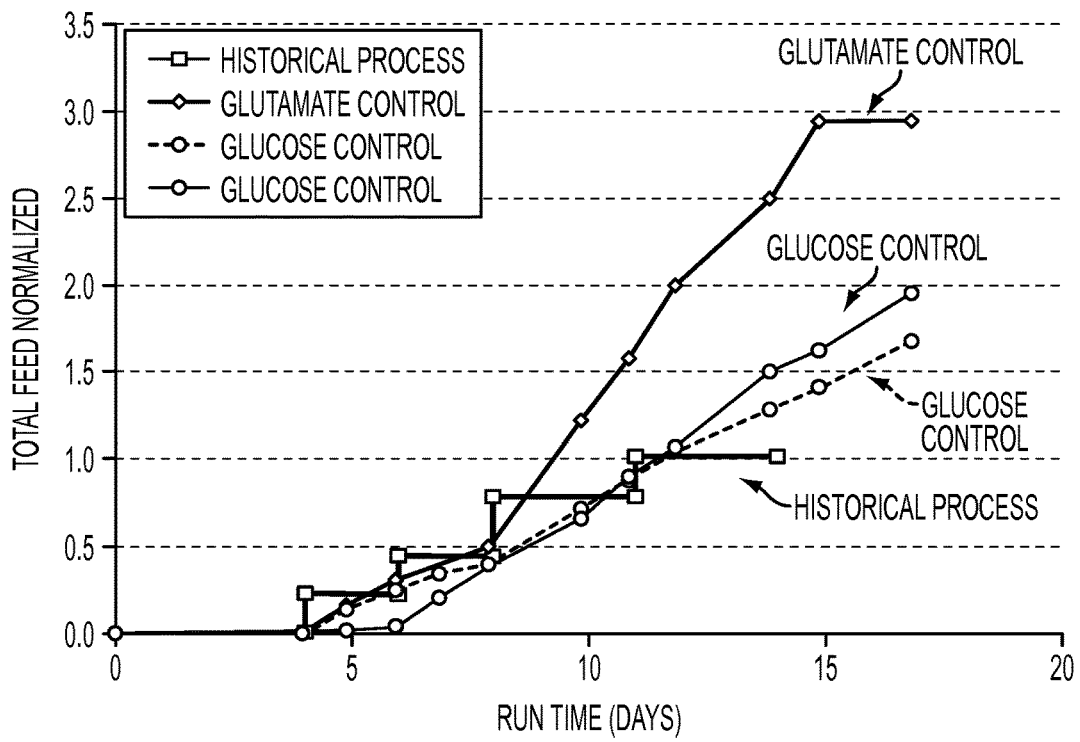
FIG. 7A is a non-limiting example of a plot showing normalized total feed versus run time for glutamate control, glucose controls, and historical process.
Figure 7B:
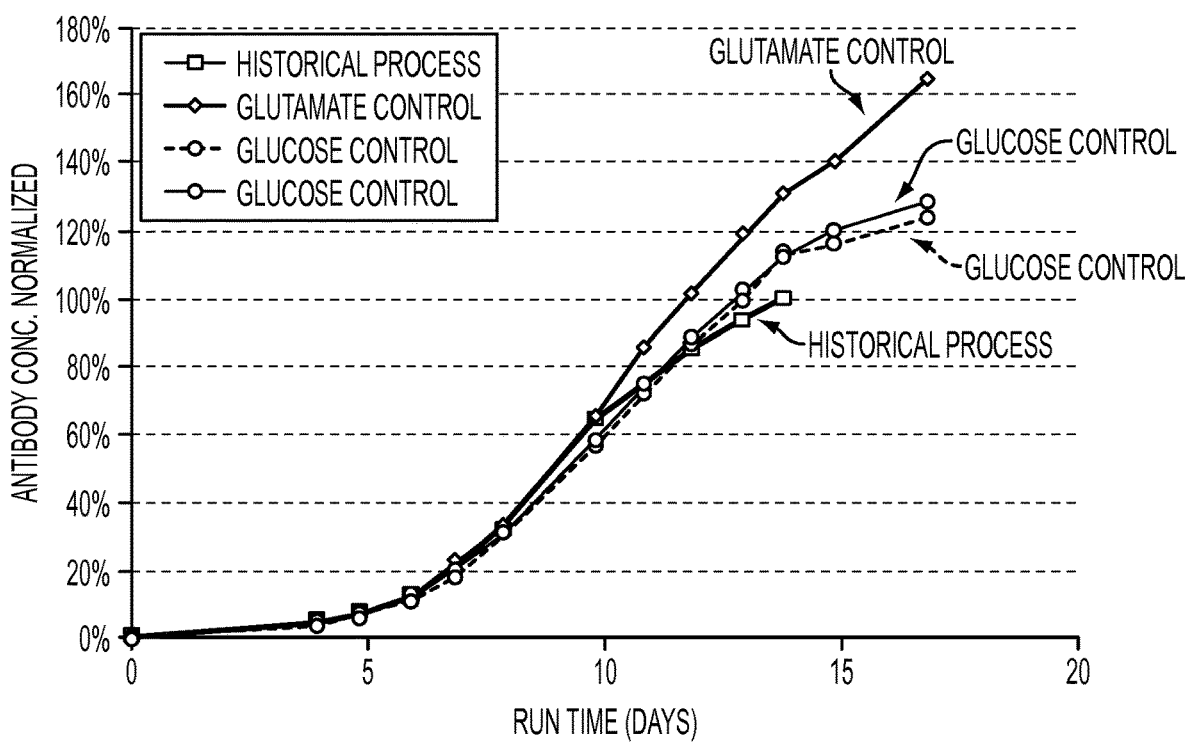
FIG. 7B is a non-limiting example of a plot showing normalized antibody concentration versus run time for glutamate control, glucose controls, and historical process.

The system thus provides a control strategy that continually monitors the process and controls feeding at a given glucose set point (See FIG. 7). The system reduces the need for culture sampling, which is a main source for labor and contamination in cell culture.

Example 6

Feedback Control with Glucose in Pilot Scale Reactors

Figure 15:
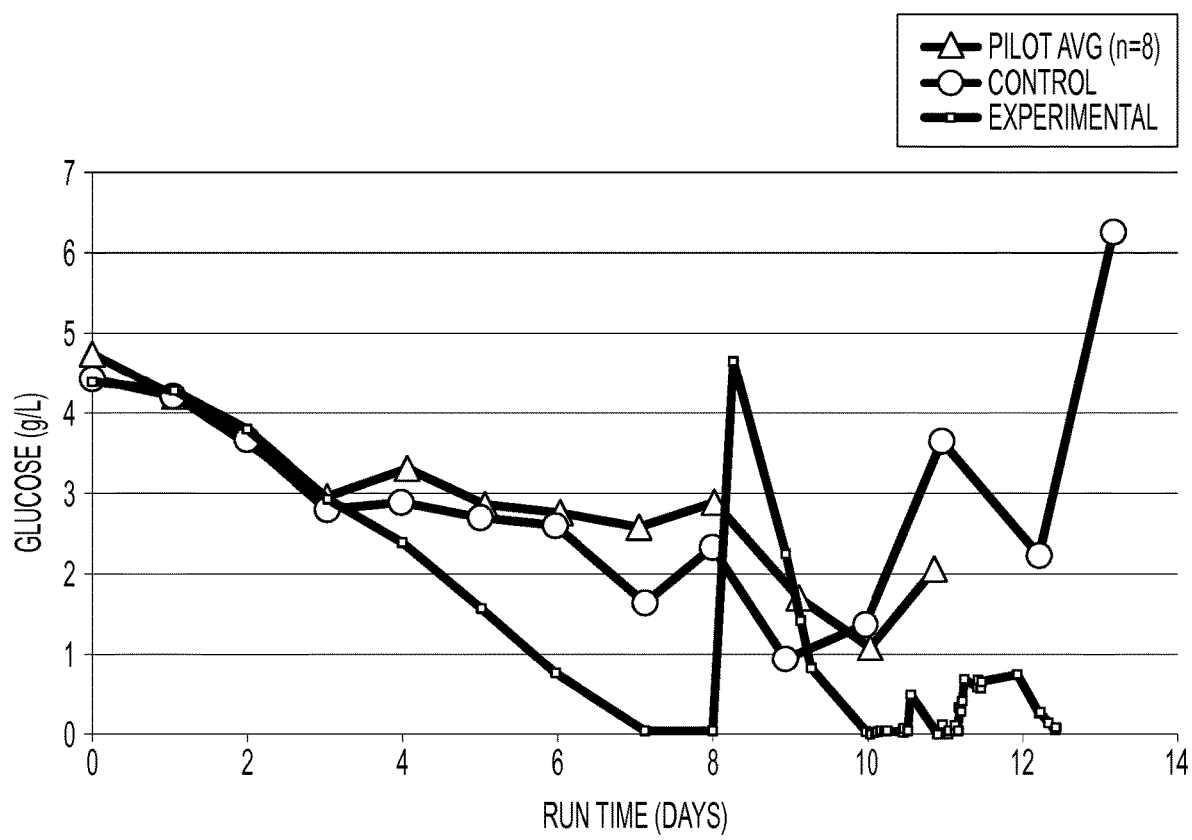
FIG. 15 is a non-limiting example of a plot showing glucose levels versus run time for experimental, control and a historical average.
Figure 16:
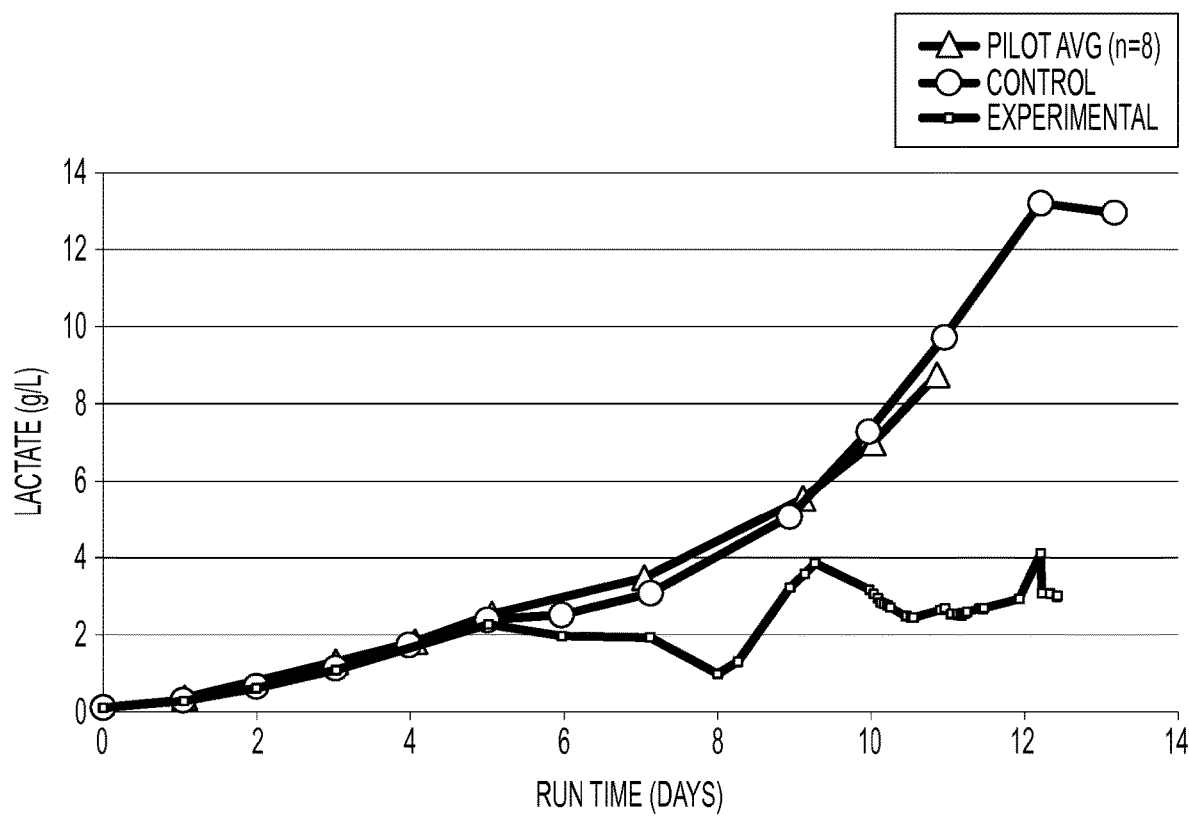
FIG. 16 is a non-limiting example of a plot showing lactate levels versus run time for experimental, control and a historical average.
Figure 17:
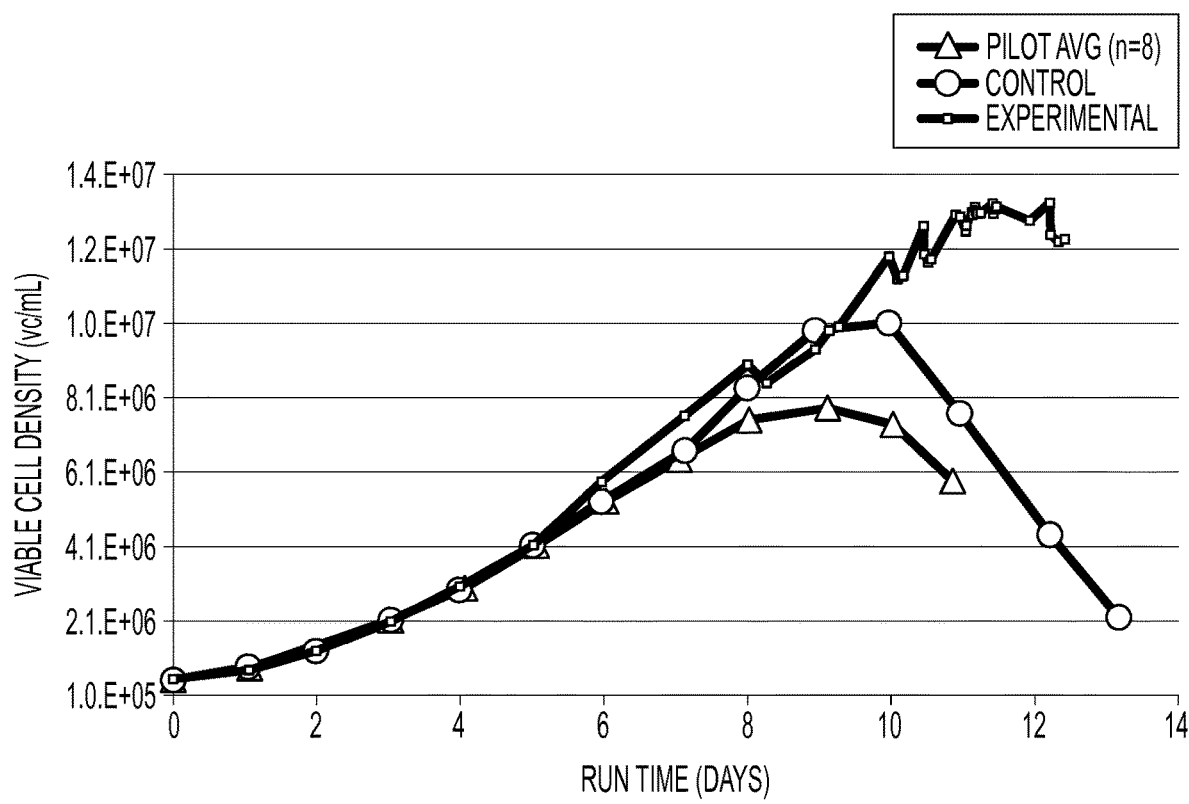
FIG. 17 is a non-limiting example of a plot showing viable cell density versus run time for experimental, control and a historical average.
Figure 18:
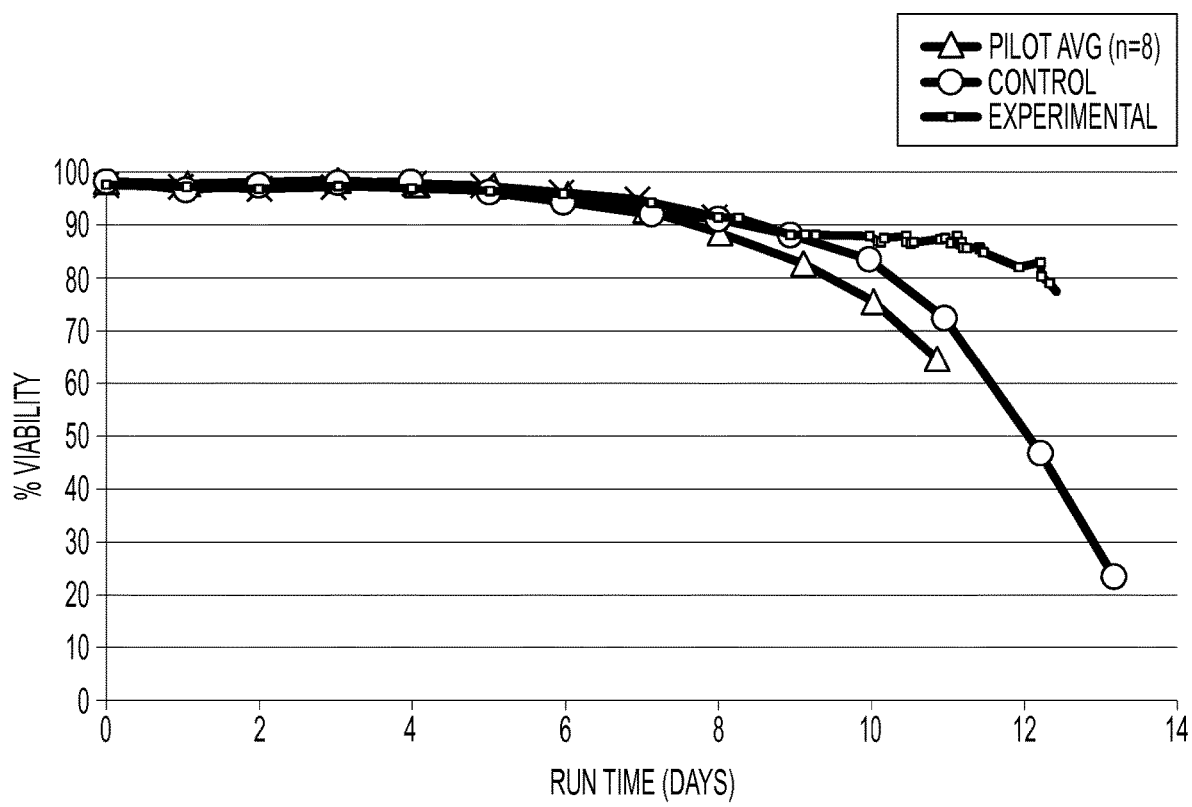
FIG. 18 is a non-limiting example of a plot showing percent viability versus run time for experimental, control and a historical average.

Raman based feedback control of glucose along with system perturbation was used to investigate the relationship between glucose and lactate in a bioreactor. The experimental sample was deprived of additional glucose until it reached a critical threshold of 0.20 g/L at which point the system began feeding based on Raman data in an attempt to match feed with consumption. On Day 8, the system was perturbed with glucose, and then the initial deprivation protocol was followed again. FIG. 15 shows the glucose trend of the experimental condition in contrast with the control and the historical average. FIG. 16 shows that a deviation in lactate production/consumption is visible as early as Day 6. After Day 6, lactate in the control and historical data begins to rapidly accumulate while the experimental condition exhibits lactate consumption, indicating that the deprivation of glucose has induced lactate consumption. After the Day 8 glucose perturbation, the lactate in the experimental condition increases precipitously, as is expected, however, returning to a glucose deprivation scheme is able to induce lactate consumption a second time. VCD (FIG. 17) and viability (FIG. 18) data indicate that the impact of the deprivation scheme was positive despite the Day 8 perturbation. Data presented here indicate that Raman driven automated control is useful for controlling reactor conditions to suppress lactate production and induce lactate consumption.

Equivalents

The foregoing written specification is considered to be sufficient to enable one skilled in the art to practice methods disclosure herein. The present disclosure is not to be limited in scope by examples provided, since the examples are intended as a single illustration of one aspect of the disclosure and other functionally equivalent embodiments are within the scope of the disclosure. Various modifications of the disclosure in addition to those shown and described herein will become apparent to those skilled in the art from the foregoing description and fall within the scope of the appended claims. The advantages and objects of the disclosure are not necessarily encompassed by each embodiment of the disclosure.

The contents of all references, patents and published patent applications cited throughout this application are incorporated herein by reference in their entirety, particularly for the use or subject matter referenced herein.

What is claimed is:

1. A method of evaluating a culture component level in a culture medium, the method comprising:
receiving a first Raman spectrum of a culture medium to be evaluated for a culture component level of a culture component, wherein the culture medium comprises cells being cultured;
determining a Raman signature of the culture component, wherein determining the Raman signature comprises removing peaks relating to the culture component from the first Raman spectrum that are distorted compared to corresponding peaks of the culture component identified in a second Raman spectrum of the culture component in a non-interfering solution;
parsing the first Raman spectrum of the culture medium with the Raman signature of the culture component to identify peaks in the first Raman spectrum corresponding to the culture component;
measuring intensity of the identified peaks to evaluate the culture component level in the culture medium;
determining that the culture component level is outside a predetermined range; and
in response to the culture component level being outside the predetermined range, adjusting the culture component level by changing a rate at which a feed is added to the culture medium, wherein adjusting the culture component level restores the culture component level to be within the predetermined range.

2. The method of claim 1, wherein the culture component is glucose.

3. The method of claim 2, wherein the Raman signature of glucose comprises at least 4 peaks in the 200 $cm^{-1}$ to 3400 $cm^{-1}$ wavenumber range.

4. The method of claim 2, wherein the Raman signature of glucose comprises at least 6 peaks in the 200 $cm^{-1}$ to 3400 $cm^{-1}$ wavenumber range.

5. The method of claim 4, wherein the peaks are peak 1, range: 364-440, peak 402 (all in $cm^{-1}$), peak 2, range: 511-543, peak 527 (all in $cm^{-1}$), peak 3, range: 577-600, peak 589 (all in $cm^{-1}$), peak 4, range: 880-940, peak 911 (all in $cm^{-1}$), peak 5, range: 1130-1180, peak 1155 (all in $cm^{-1}$), and peak 6, range: 1262-1290, peak 1276 (all in $cm^{-1}$).

6. The method of claim 2, wherein the Raman signature of glucose comprises at least 10 peaks in the 200 $cm^{-1}$ to 3400 $cm^{-1}$ wavenumber range.

7. The method of claim 6, wherein the peaks are peak 1, range: 364-440, peak 402 (all in $cm^{-1}$), peak 2, range: 511-543, peak 527 (all in $cm^{-1}$), peak 3, range: 577-600, peak 589 (all in $cm^{-1), peak}$ 4, range: 749-569, peak 759 (all in $cm^{-1}$), peak 5, range: 880-940, peak 911 (all in $cm^{-1}$), peak 6, range: 1050-1070, peak 1060 (all in $cm^{-1}$), peak 7, range: 1110-1140, peak 1125 (all in $cm^{-1}$), peak 8, range: 1130-1180, peak 1155 (all in $cm^{-1}$), peak 9, range: 1262-1290, peak 1276 (all in $cm^{-1}$), and peak 10, range: 1520-1578, peak 1549 (all in $cm^{-1}$).

8. The method of claim 2, wherein the Raman signature comprises at least 20 peaks in the 200 $cm^{-1}$ to 3400 $cm^{-1}$ wavenumber range.

9. The method of claim 8, wherein the peaks are peak 1, range: 364-440, peak 402 (all in $cm^{-1}$), peak 2, range: 511-543, peak 527 (all in $cm^{-1}$), peak 3, range: 577-600, peak 589 (all in $cm^{-1}$), peak 4, range: 720-740, peak 732 (all in $cm^{-1}$), peak 5, range: 769-799, peak 789 (all in $cm^{-1}$), peak 6, range: 835-875, peak 855 (all in $cm^{-1}$), peak 7, range: 880-940, peak 911 (all in $cm^{-1}$), peak 8, range: 950-1015, peak 968 (all in $cm^{-1}$), peak 9, range: 1050-1070, peak 1060 (all in $cm^{-1}$), peak 10, range: 1063-1080, peak 1073 (all in $cm^{-1}$), peak 11, range: 1110-1140, peak 1125 (all in $cm^{-1}$), peak 12, range: 1130-1180, peak 1155 (all in $cm^{-1}$), peak 13, range: 1190-1240, peak 1210 (all in $cm^{-1}$), peak 14, range: 1262-1290, peak 1276 (all in $cm^{-1}$), peak 15, range: 1330-1342, peak 1336 (all in $cm^{-1}$), peak 16, range: 1350-1380, peak 1371 (all in $cm^{-1}$), peak 17, range: 1390-1410, peak 1401 (all in $cm^{-1}$), peak 18, range: 1425-1475, peak 1450 (all in $cm^{-1}$), peak 19, range: 1465-1480, peak 1473 (all in $cm^{-1}$), and peak 20, range: 1520-1578, peak 1549 (all in $cm^{-1}$).

10. The method of claim 2, further comprising adjusting the glucose level if the level is outside a range of 1-3 g/L.

11. The method of claim 1, further comprising evaluating one or more of the following culture parameters: viable cell density, level of lactate, level of glutamine, level of glutamate, level of ammonium, osmolality, or pH.

12. The method of claim 1, wherein the distorted peaks are laterally shifted peaks and/or inverted peaks.

13. The method of claim 12, comprising removing a laterally shifted peak or an inverted peak if the peak is shifted by more than 5 $cm^{-1}$ in a concentration-dependent fashion.

14. The method of claim 1, wherein the predetermined range is optimal for cell growth.

15. The method of claim 1, further comprising parsing the first Raman spectrum with a plurality of Raman signatures, each associated with a specific level of the culture component in a culture medium.

* * * * *